United States Patent
Lee et al.

(10) Patent No.: US 11,922,008 B2
(45) Date of Patent: Mar. 5, 2024

(54) ELECTRONIC DEVICE PROCESSING INPUT OF STYLUS PEN AND METHOD FOR OPERATING THE SAME

(71) Applicant: SAMSUNG ELECTRONICS CO., LTD., Suwon-si (KR)

(72) Inventors: Jiwon Lee, Suwon-si (KR); Munwon Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/884,218

(22) Filed: Aug. 9, 2022

(65) Prior Publication Data

US 2023/0037709 A1 Feb. 9, 2023

Related U.S. Application Data

(63) Continuation of application No. PCT/KR2022/010919, filed on Jul. 25, 2022.

(30) Foreign Application Priority Data

Aug. 9, 2021 (KR) .................. 10-2021-0104923

(51) Int. Cl.
*G06F 3/041* (2006.01)
*G06F 3/044* (2006.01)
*G06F 3/04883* (2022.01)

(52) U.S. Cl.
CPC ........ *G06F 3/04883* (2013.01); *G06F 3/0416* (2013.01); *G06F 3/0441* (2019.05)

(58) Field of Classification Search
CPC .... G06F 3/016; G06F 3/03545; G06F 3/0416; G06F 3/0441; G06F 3/04883; G06F 2203/0384
See application file for complete search history.

(56) References Cited

U.S. PATENT DOCUMENTS

2005/0179648 A1* 8/2005 Barabe ............... G06F 3/04883
                                                345/156
2006/0072856 A1   4/2006 Su et al.
(Continued)

FOREIGN PATENT DOCUMENTS

JP      2017207868 A    11/2017
KR    20120040970 A     4/2012
(Continued)

OTHER PUBLICATIONS

International Search Report with English Translation and Written Opinion for International Application No. PCT/KR2022/010919; International Filing Date Jul. 25, 2022; dated Oct. 21, 2022; 10 pages.

*Primary Examiner* — Ryan A Lubit
(74) *Attorney, Agent, or Firm* — CANTOR COLBURN LLP

(57) ABSTRACT

According to various embodiments, an electronic device may comprise a touchscreen and a processor configured to identify a touch input generated by a stylus pen via the touchscreen, identify whether the touch input meets a first condition for generating a specific gesture, identify whether the touch input meets a second condition including at least one of a time condition, a length condition, and a space condition using a touch start point of the touch input or an end point of a prior touch input as a reference point, based on the touch input meeting the first condition, and execute a function corresponding to the specific gesture based on the touch input meeting the second condition.

20 Claims, 19 Drawing Sheets

(56) References Cited

U.S. PATENT DOCUMENTS

| | | | |
|---|---|---|---|
| 2011/0216015 A1* | 9/2011 | Edwards | G06F 3/04883 |
| | | | 345/173 |
| 2012/0098772 A1 | 4/2012 | Eun et al. | |
| 2014/0237415 A1* | 8/2014 | Amerige | G06F 3/04842 |
| | | | 715/781 |
| 2016/0077650 A1* | 3/2016 | Durojaiye | G06F 3/03545 |
| | | | 345/173 |
| 2017/0046038 A1* | 2/2017 | Hajas | G06F 3/04166 |
| 2017/0102853 A1* | 4/2017 | Saur | G06F 3/0488 |
| 2018/0024693 A1 | 1/2018 | Westerman et al. | |
| 2018/0239482 A1* | 8/2018 | Hinckley | G06F 3/03545 |
| 2020/0210059 A1 | 7/2020 | Hu et al. | |
| 2021/0026531 A1 | 1/2021 | Mozumder et al. | |

FOREIGN PATENT DOCUMENTS

| | | |
|---|---|---|
| KR | 1020130138659 A | 12/2013 |
| KR | 20140122687 A | 10/2014 |
| KR | 1020150012396 A | 2/2015 |
| KR | 20160024505 A | 3/2016 |
| KR | 20170053709 A | 5/2017 |
| KR | 101745622 B1 | 6/2017 |
| KR | 20180030603 A | 3/2018 |
| WO | 2019016849 A1 | 1/2019 |

\* cited by examiner

ELECTRONIC DEVICE PROCESSING INPUT OF STYLUS PEN AND METHOD FOR OPERATING THE SAME

CROSS-REFERENCE TO RELATED APPLICATION(S)

This application is a bypass continuation application of International Application No. PCT/KR2022/010919, which was filed on Jul. 25, 2022, and is based on and claims priority under 35 U.S.C. § 119 to Korean Patent Application No. 10-2021-0104923, which was filed in the Korean Intellectual Property Office on Aug. 9, 2021, the entire disclosure of each of which is incorporated herein by reference.

BACKGROUND

Various embodiments relate to an electronic device that processes an input of a stylus pen and a method for operating the electronic device.

Electronic devices are being developed to be able to receive various inputs from the user through specified input devices (e.g., a stylus pen) connected with the electronic device via wireless communication. An electronic device may identify a designated position on the electronic device with a pen input device (which may be referred to herein as a stylus pen for ease of description) and perform one or more corresponding actions.

The electronic device may detect magnetic fields produced from the stylus pen using electromagnetic resonance (EMR). An electronic device may identify the position of a stylus pen based on an electromotive force generated by a magnetic field per channel.

The stylus pen may be connected with the electronic device via short-range communication (e.g., Bluetooth low energy (BLE)). The stylus pen may transmit information about a state of a button on the housing of the stylus pen to the electronic device via short-range communication, and the electronic device may perform a designated operation based on the received information.

SUMMARY

The electronic device may display handwriting corresponding to touch input through the stylus pen. Further, the electronic device may identify a gesture corresponding to the touch input through the stylus pen and may execute a function corresponding to the identified gesture.

The gesture recognition technology provided by the electronic device is not optimized for touch input using a stylus pen. For example, when the user writes or makes a drawing with a stylus pen, the electronic device may misrecognize the handwriting or drawing as a gesture not intended by the user. For example, when the user colors a round dot with a stylus pen, the electronic device may recognize it as a gesture of long-pressing a specific point rather than coloring the dot. In this case, the electronic device performs the function of deleting the dot colored by the user and displaying a pop-up window corresponding to the corresponding gesture.

Various embodiments may provide an electronic device and method for operating the same, which may identify whether the gesture indicated by an identified touch input made with a stylus pen meets a gesture generation condition and when the gesture generation condition is met, determine whether to execute a function corresponding to the gesture indicated by the touch input depending on whether the touch input meets a time condition, a length condition, and a space condition.

According to various embodiments, an electronic device may comprise a touchscreen and a processor configured to identify a touch input generated by a stylus pen via the touchscreen, identify whether the touch input meets a first condition for generating a specific gesture, identify whether the touch input meets a second condition including at least one of a time condition, a length condition, and a space condition, using a touch start point of the touch input or an end point of a prior touch input as a reference point, based on the touch input meeting the first condition, and execute a function corresponding to the specific gesture based on the touch input meeting the second condition.

According to various embodiments, a method for operating an electronic device may comprise identifying a touch input generated by a stylus pen via a touchscreen included in the electronic device, identifying whether the touch input meets a first condition for generating a specific gesture, identifying whether the touch input meets a second condition including at least one of a time condition, a length condition, and a space condition, using a touch start point of the touch input or an end point of a prior touch input as a reference point, based on the touch input meeting the first condition, and executing a function corresponding to the specific gesture based on the touch input meeting the second condition.

According to various embodiments, a non-transitory recording medium may store one or more programs, the one or more programs comprising instructions configured to, when executed by a processor of an electronic device, cause the electronic device to identify a touch input generated by a stylus pen via a touchscreen included in an electronic device, identify whether the touch input meets a first condition for generating a specific gesture, identify whether the touch input meets a second condition including at least one of a time condition, a length condition, and a space condition, using a touch start point of the touch input or an end point of a prior touch input as a reference point, based on the touch input meeting the first condition, and execute a function corresponding to the specific gesture based on the touch input meeting the second condition.

According to various embodiments, the electronic device may increase the recognition accuracy of the gesture input through a stylus pen based on at least part of information gathered during touch interaction and prevent the occurrence of a gesture that is not intended by the user.

DETAILED DESCRIPTION

Figure 1:
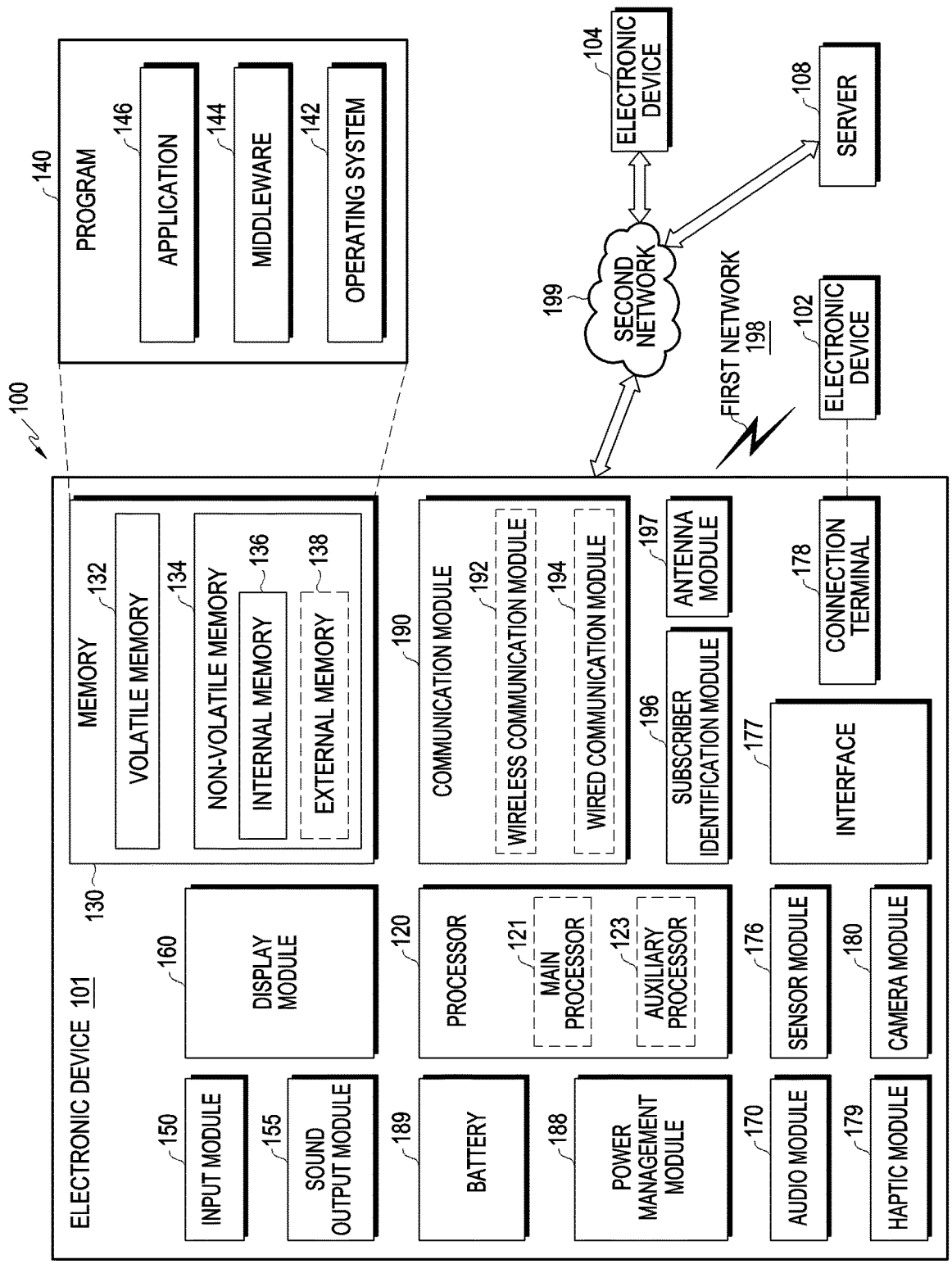
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
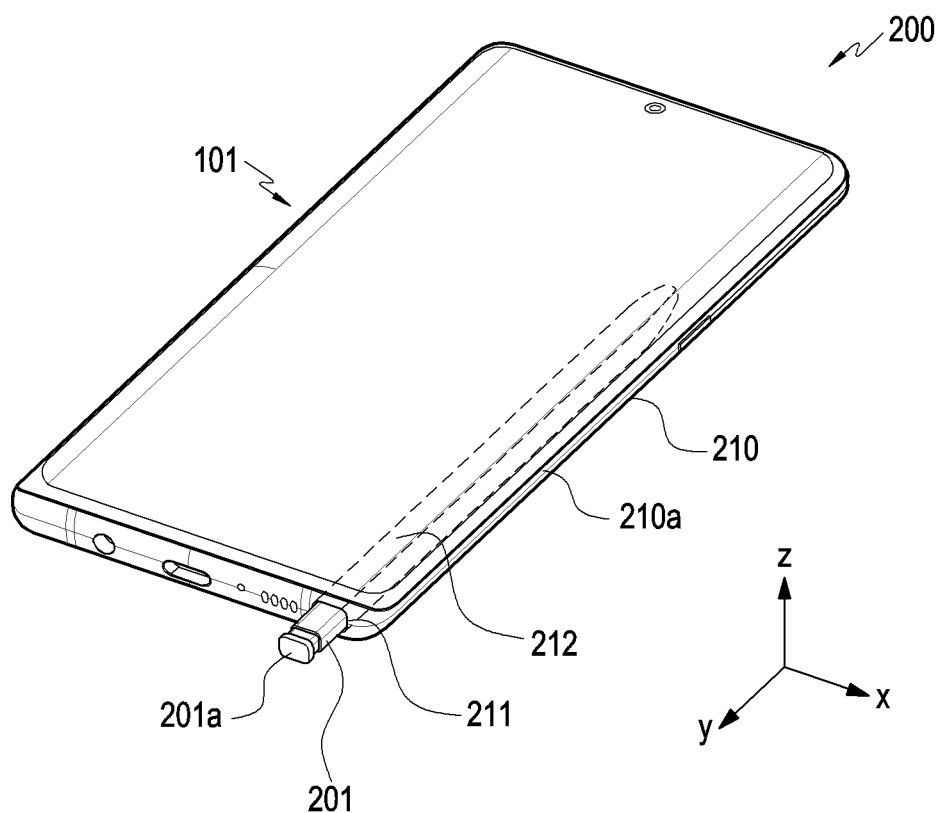
FIG. 2 is a perspective view illustrating an electronic device including a stylus pen according to various embodiments.

FIG. 2 is a perspective view 200 illustrating an electronic device 101, including a stylus pen 201 (e.g., the electronic device 102 of FIG. 1) according to various embodiments. According to an embodiment, the stylus pen 201 may correspond to the input module 150 of FIG. 1 but rather than the electronic device 102 of FIG. 1.

Referring to FIG. 2, according to various embodiments, the electronic device 101 may include the configuration shown in FIG. 1 and may have a structure where the stylus pen 201 may be inserted and stored. The electronic device 101 may include a housing 210, and a hole 211 may be formed in a portion of the housing 210, e.g., a portion of a side surface 210*a*. The electronic device 101 may include a first inner space 212, which is a storage space connected with the hole 211, and the stylus pen 201 may be inserted into the first inner space 212. In the embodiment shown, the stylus pen 201 may have a pressable first button 201*a* at an end thereof to be easily pulled out of the first inner space 212 of the electronic device 101. When the first button 201*a* is pressed, a repulsive mechanism (e.g., at least one elastic member, e.g., a spring) configured in association with the first button 201*a* may be operated to allow the stylus pen 201 to be removed from the first inner space 212.

According to various embodiments, the electronic device 101 may include a structure in which the stylus pen 201 may be attached to the electronic device 101. For example, the electronic device 101 may include at least one magnetic material in a position adjacent to the attachment area so that the stylus pen 201 may be attached to the outside of the housing 210. The stylus pen 201 may be attached to the outside of the housing 210 of the electronic device 101 through at least one magnetic material.

Figure 3:
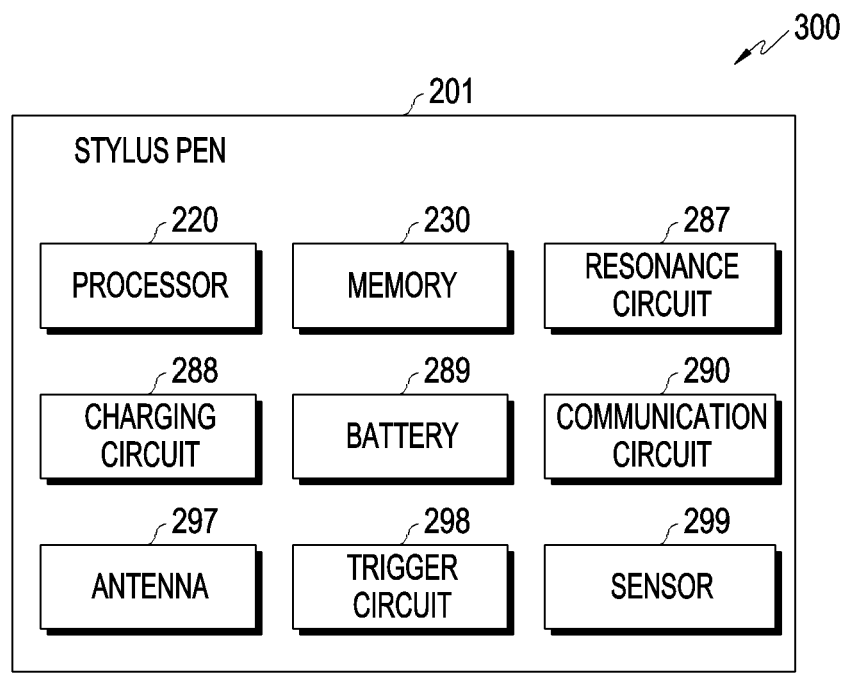
FIG. 3 is a block diagram illustrating a stylus pen according to various embodiments.

FIG. 3 is a block diagram 300 illustrating a stylus pen (e.g., the stylus pen 201) according to various embodiments.

Referring to FIG. 3A, according to various embodiments, the stylus pen 201 may include a processor 220, a memory 230, a resonance circuit 287, a charging circuit 288, a battery 289, a communication circuit 290, an antenna 297, a trigger circuit 298, and/or a sensor 299. According to some embodiments, the processor 220, at least part of the resonance circuit 287, and/or at least part of the communication circuit 290 of the stylus pen 201 may be configured in the form of a chip or on a printed circuit board. The processor 220, the resonance circuit 287, and/or the communication circuit 290 may be electrically connected with the memory 230, the charging circuit 288, the battery 289, the antenna 297, the trigger circuit 298, and/or the sensor 299.

According to various embodiments, the processor 220 may include a customized hardware module or a generic processor configured to execute software (e.g., an application program). The processor 220 may include a hardware component (function) or software element (program), including at least one of a communication module or a module to manage the state or environment of the stylus pen 201, an input/output interface, a data measuring module, and various sensors provided in the stylus pen 201. The processor 220 may include, e.g., a hardware module, a software module, a firmware module, or a combination of two or more thereof. According to an embodiment, the processor 220 may be configured to transmit, through the communication circuit 290 to the electronic device 101, information indicating a pressing state of a button (e.g., the button 337), sensing information obtained by the sensor 299, and/or information (e.g., information associated with the position of the stylus pen 201) calculated based on the sensing information.

According to various embodiments, the resonance circuit 287 may resonate based on an electromagnetic field signal generated from a digitizer (e.g., the display module 160) of the electronic device 101 and may radiate an electromagnetic resonance (EMR) input signal (or magnetic field) by the resonance. The electronic device 101 may identify the position of the stylus pen 201 over the electronic device 101 using the EMR input signal. For example, the electronic device 101 may identify the position of the stylus pen 201 based on the magnitude of the electromotive force (e.g., output current) generated by the EMR input signal at each of a plurality of channels (e.g., a plurality of loop coils) in the digitizer. Although the electronic device 101 and the stylus pen 201 are described as operated based on the EMR scheme, this is merely an example. For example, the electronic device 101 may generate an electrical field-based signal based on an electrically coupled resonance (ECR) scheme. The resonance circuit of the stylus pen 201 may be resonated by the electric field. The electronic device 101 may identify the electric potential at the plurality of channels (e.g., electrodes) by the resonance of the stylus pen 201 and may identify the position of the stylus pen 201 based on the electric potential. The stylus pen 201 may be implemented in an active electrostatic (AES) scheme, and it will be easily appreciated by one of ordinary skill in the art that it is not limited to a specific kind of implementation. Further, the electronic device 101 may detect the stylus pen 201 based on a variation in capacitance (self-capacitance or mutual capacitance) associated with at least one electrode of the touch panel. In this case, the stylus pen 201 may not include the resonance circuit. In the disclosure, "panel" or "sensing panel" may be used as a term collectively referring to a digitizer and touch screen panel (TSP).

According to various embodiments, the memory 230 may store information related to the operation of the stylus pen 201. For example, the information may include information for communicating with the electronic device 101 and frequency information related to the input operation of the stylus pen 201. The memory 230 may store a program (or application, algorithm, or processing loop) for calculating information (e.g., coordinate information and/or displacement information) about the position of the stylus pen 201 from the sensing data obtained by the sensor 299. The memory 230 may store the communication stack of the communication circuit 290. According to an implementation, the communication circuit 290 and/or processor 220 may include a dedicated memory.

According to various embodiments, the resonance circuit 287 may include a coil (or inductor) and/or capacitor. The resonance circuit 287 may be resonated based on an input electric field and/or magnetic field (e.g., an electric field and/or magnetic field generated from the digitizer of the electronic device 101). When the stylus pen 201 transmits signals via the EMR scheme, the stylus pen 201 may generate a signal having a resonance frequency based on an electromagnetic field generated from the inductive panel of the electronic device 101. When the stylus pen 201 transmits signals via the AES scheme, the stylus pen 201 may generate a signal using a capacitive coupling with the electronic device 101. When the stylus pen 201 transmits signals via the ECR scheme, the stylus pen 201 may generate a signal having a resonance frequency based on an electric field generated from a capacitive device of the electronic device. According to an embodiment, the resonance circuit 287 may be used to vary the frequency or strength of the electromagnetic field according to the user's manipulation state. For example, the resonance circuit 287 may provide various frequencies to recognize a hovering input, drawing input, button input, or erasing input. For example, the resonance circuit 287 may provide various resonance frequencies according to combinations of connections of a plurality of capacitors or based on a variable inductor and/or variable capacitor.

According to various embodiments, when connected with the resonance circuit 287 based on a switching circuit, the charging circuit 288 may rectify a resonance signal generated from the resonance circuit 287 into a direct current (DC) signal and provide the DC signal to the battery 289. According to an embodiment, the stylus pen 201 may identify whether the stylus pen 201 is inserted into the electronic device 101 using a voltage level of a DC signal sensed by the charging circuit 288. Or the stylus pen 201 may identify the pattern corresponding to the signal identified by the charging circuit 288, thereby identifying whether the stylus pen 201 has been inserted.

According to various embodiments, the battery 289 may be configured to store power required to operate the stylus pen 201. The battery 289 may include, e.g., a lithium-ion battery or a capacitor and may be recharged or replaced. According to an embodiment, the battery 289 may be charged with power (e.g., DC signal (DC power)) received from the charging circuit 288.

According to various embodiments, the communication circuit 290 may be configured to perform wireless communication between the stylus pen 201 and the communication module 190 of the electronic device 101. According to an embodiment, the communication circuit 290 may transmit state information about the stylus pen 201, input information, and/or position-related information to the electronic device 101 using a short-range communication scheme. For example, the communication circuit 290 may transmit direction information (e.g., motion sensor data) about the stylus pen 201 obtained through the trigger circuit 298, voice information entered through the microphone, or remaining power information about the battery 289 to the electronic device 101. For example, the communication circuit 290 may transmit the sensing data obtained from the sensor 299 and/or information associated with the position of the stylus pen 201, identified based on the sensing data, to the electronic device 101. For example, the communication circuit 290 may transmit information about the state of a button (e.g., the button 337) of the stylus pen 201 to the electronic device 101. As an example, the short-range communication scheme may include at least one of Bluetooth, Bluetooth low energy (BLE), near-field communication (NFC), and wireless-fidelity (Wi-Fi) direct, but is not limited in kind to. According to various embodiments, the antenna 297 may be used to transmit signals or power to the outside (e.g., the electronic device 101) or receive signals or power from the outside. According to an embodiment, the stylus pen 201 may include a plurality of antennas 297 and select at least one antenna 297 appropriate for the communication scheme from among the plurality of antennas. The communication circuit 290 may exchange signals or power with an external electronic device through the at least one selected antenna 297.

According to various embodiments, the trigger circuit 298 may include at least one button or sensor circuit. According to an embodiment, the processor 220 may identify the input scheme (e.g., touch or press) or kind (e.g., EMR button or BLE button) of the button of the stylus pen 201. According to an embodiment, the trigger circuit 298 may transmit a trigger signal to the electronic device 101 using a signal through a sensor 299 or a button input signal.

According to various embodiments, the sensor 299 may include an accelerometer, a gyro sensor, and/or a geomagnetic sensor. The accelerometer may sense linear movement of the stylus pen 201 and/or information about the acceleration on the three axes, six axes, and/or nine axes of the stylus pen 201. The gyro sensor may sense information related to the rotation of the stylus pen 201. The geomagnetic sensor may sense information about the direction of the stylus pen 201 in an absolute coordinate system. According to an embodiment, the sensor 299 may include a sensor capable of generating an electric signal or data value corresponding to the internal operation status or external environment of the stylus pen 201, such as, e.g., a remaining battery capacity sensor, pressure sensor, optical sensor, temperature sensor, or biometric sensor, as well as the sensor for measuring the movement. According to an embodiment, the processor 220 may transmit the information obtained from the sensor 299 through the communication circuit 290 to the electronic device 101. The processor 220 may transmit information (e.g., the coordinates of the stylus pen 201 and/or the displacement of the stylus pen 201) associated with the position of the stylus pen 201 based on the information obtained from the sensor 299 through the communication circuit 290 to the electronic device 101.

Figure 4:
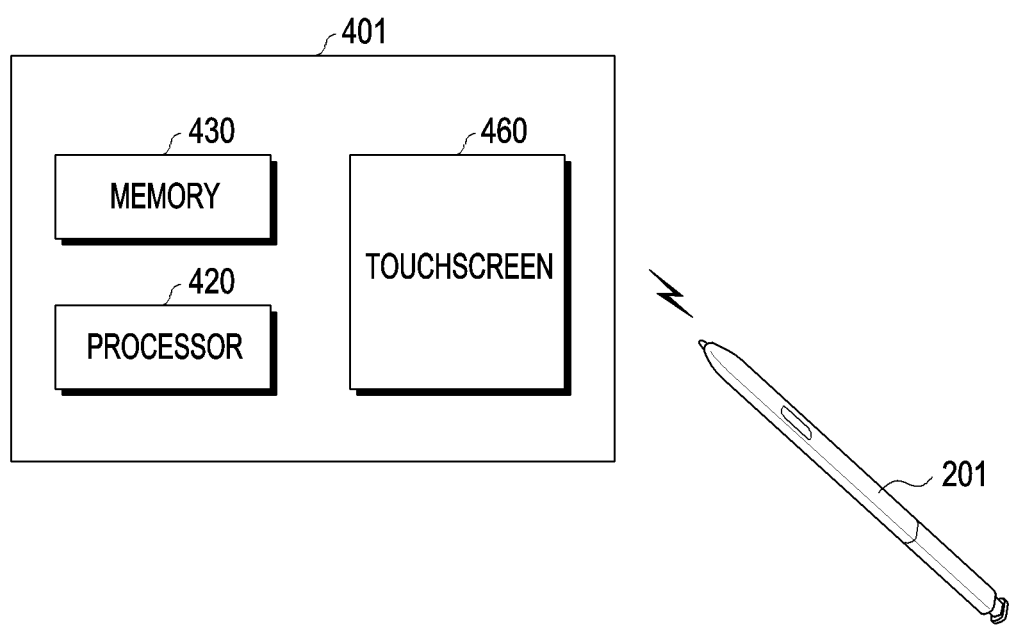
FIG. 4 is a block diagram illustrating an electronic device according to various embodiments.

FIG. 4 is a block diagram illustrating an electronic device according to various embodiments.

Referring to FIG. 4, an electronic device 401 may include a processor 420, a memory 430, and a touchscreen 460. For example, the electronic device 401 may be implemented to be identical or similar to the electronic device 101 of FIG. 1.

According to various embodiments, the processor 420 may control the overall operation of the electronic device 401. For example, the processor 420 may be implemented to be identical or similar to the processor 120 of FIG. 1.

According to various embodiments, the processor 420 may identify a touch input generated by the stylus pen 201 or the user's hand via the touchscreen 460 (e.g., the display module 160 of FIG. 1). Alternatively, the processor 420 may identify an input generated by an input device, such as a mouse or a trackball, via the touchscreen 460 (e.g., the display module 160 of FIG. 1). The processor 420 may identify the start and completion of the touch input (or the input generated by the input device). For example, when a touchdown by the stylus pen 201 or the user's hand is identified on the touchscreen 460, the processor 420 may identify that a touch input has started. Thereafter, when the touch-up by the stylus pen 201 or the user's hand is identified on the touchscreen 460, the processor 420 may identify that the touch input has been completed.

According to various embodiments, the processor 420 may identify the movement path of the touch input from the start of the touch to the completion of the touch. Further, the processor 420 may identify the movement distance of the touch input from the start of the touch to the completion of the touch.

According to various embodiments, the processor 420 may identify whether the gesture indicated by the touch input (or the input generated by the input device) meets a preset gesture generation condition. For example, the processor 420 may identify the gesture indicated by the touch input based on the start, the movement path, and the completion of the touch input. The gesture is identified from among a plurality of predesignated gestures. The processor 420 may identify whether the gesture indicated by the touch input meets a gesture generation condition for generating a specific gesture from among the plurality of gestures supported by the electronic device 401 based on the touch start, the touch move, and/or the touch completion. For example, the plurality of gestures may include a single tap, a multi-tap, a hold, a long press, a move and hold, a scroll input, a fling input, movement of two touches in different directions, and/or rotation of two touches in different directions. For example, a different gesture generation condition may be set for each of the plurality of gestures. According to various embodiments, the electronic device 101 can have different, additional, or fewer gestures than those listed and described herein. The gestures described herein are some examples and the technical solutions described herein are not limited to only those gestures.

According to various embodiments, if the gesture indicated by the touch input fails to meet the gesture generation condition for generating the specific gesture, the processor 420 may display the handwriting (or drawing) indicated by the touch input on the touchscreen 460. For example, if the touch input does not indicate a predesignated gesture, the processor 420 may display the handwriting (or drawing) inputted by the touch input on the touchscreen 460.

According to various embodiments, if the gesture indicated by the touch input meets the gesture generation condition for generating the specific gesture, the processor 420 may identify whether the touch input meets at least one of a time condition, length condition, and space condition designated for the gesture, using the touch start point of the touch input or the endpoint of the prior touch input, as a reference point. In other words, although the gesture indicated by the touch input meets the gesture generation condition, the processor 420 may not immediately execute the function corresponding to the specific gesture. For example, the time condition may mean a condition for the time when the touch input is made. The length condition may mean a condition for the length of the path of the touch input. The space condition may mean a condition for whether the touch input is positioned within or outside a specific space.

According to various embodiments, the reference point for determining the time condition, length condition, and space condition designated for the gesture may differ per gesture. For example, the reference point may be the start point of the ongoing touch input. Alternatively, the reference point may be the endpoint of the prior touch input. Or the reference point may be one of the start point or endpoint of the oldest touch input among recent touches made within 500 ms (or other duration). Alternatively, the reference point is the point to which the touch input is first moved out of a preset area. The reference point may also be the start point or endpoint of the oldest touch input among 10 (or any other N) recently identified touch inputs. Alternatively, the reference point can be a start point or endpoint of a particular touch input (e.g., the touch input whose x coordinate is 1000 or more) corresponding to the data value meeting a specific condition among the data of touch inputs. Alternatively, the reference point may be the start point or endpoint of the touch input selected by a specific algorithm. The reference point may be set automatically by the processor 420 or by the user. It is understood that the values described and used in the present disclosure are examples and that one or more embodiments may use values different from those mentioned herein. Further, the types of reference points described herein are exemplary, and other measurements can be used to determine reference point(s) in one or more embodiments. Here, a "point" (e.g., start point, endpoint, etc.) can refer to a location on the touchscreen 460. The location can be specified as a coordinate, a pixel number, or any other manner. Alternatively, a "point" can also indicate a timepoint, i.e., an instant when the touch input was started or ended by the user.

According to various embodiments, the processor 420 may determine whether to execute the function corresponding to the gesture indicated by the touch input based on whether the touch input meets at least one condition designated for the specific gesture among the time condition, length condition, and space condition. For example, if the touch input meets the time condition, length condition, and/or space condition designated for the corresponding gesture, the processor 420 may execute the function corresponding to the gesture indicated by the touch input. Alternatively, if the touch input does not meet the time condition, length condition, and/or space condition designated for the corresponding gesture, the processor 420 may not execute the function corresponding to the gesture indicated by the touch input. In this case, the processor 420 may display the movement (e.g., handwriting or drawing) indicated by the touch input on the touchscreen 460.

According to various embodiments, the processor 420 may determine whether to execute the function corresponding to the gesture indicated by a plurality of touch inputs based on whether the plurality of touch inputs meet at least one condition designated for the specific gesture among the time condition, length condition, and/or space condition.

According to various embodiments, each of the plurality of gestures may differ in at least some of the time condition, length condition, and/or space condition which differ from each other. Further, the processor 420 may execute the function corresponding to the gesture if only some of the time condition, length condition, and/or space condition are met for some gestures among the plurality of gestures.

According to various embodiments, the memory 430 may store information about the gesture generation condition for each of the plurality of gestures. Further, the memory 430 may store information about the time condition, length condition, and/or space condition for each of the plurality of gestures. For example, the memory 430 may be implemented to be substantially the same or similar to the memory 130 of FIG. 1.

Although it is described below that the electronic device 401 performs the following operations for convenience of description, at least some of the operations performed by the electronic device 401 may be controlled by the processor 420.

Figure 5:
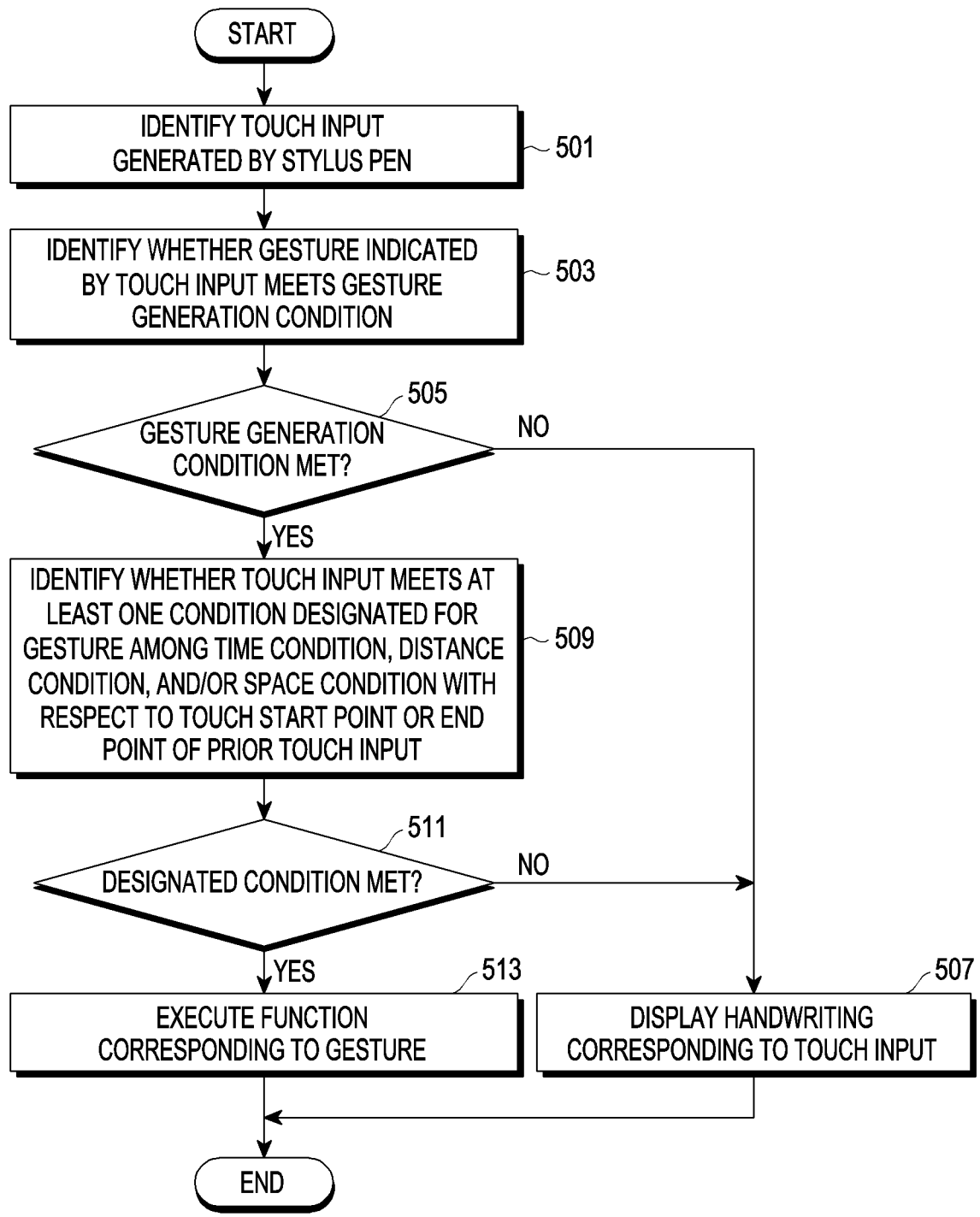
FIG. 5 is a flowchart illustrating an operation of identifying a gesture by an electronic device according to various embodiments.

FIG. 5 is a flowchart illustrating an operation of identifying a gesture by an electronic device according to various embodiments.

Referring to FIG. 5, according to various embodiments, in operation 501, the electronic device 401 may identify a touch input generated by an input device, such as a stylus pen (or the user's hand). For example, the electronic device 401 may identify the touch start (e.g., touch-down), touch move, and/or touch completion (e.g., touch-up) of the touch input. The electronic device 401 may identify the gesture indicated by the touch input based on identifying the touch start, touch move, and/or touch completion of the touch input. Here, "touch move" may indicate a movement performed by the input device (e.g., stylus pen) with contact maintained with the touchscreen 460.

According to various embodiments, in operation 503, the electronic device 401 may identify whether the gesture indicated by the touch input meets a gesture generation condition for generating a specific gesture among the plurality of gestures supported by the electronic device 401.

According to various embodiments, if the gesture indicated by the touch input does not meet the preset gesture generation condition (No in operation 505), the electronic device 401 may display the handwriting (or drawing) corresponding to the touch input on the touchscreen 460 in operation 507.

According to various embodiments, if the gesture indicated by the touch input meets the gesture generation condition (Yes in operation 505), the electronic device 401 may identify whether the touch input meets at least one condition designated for the gesture among the time condition, length condition, and/or space condition with respect to the touch start point of the touch input or the end point of the prior touch input in operation 509. For example, although the gesture indicated by the touch input meets the gesture generation condition for generating the specific gesture, the electronic device 401 may identify whether at least some of the time condition, length condition, and/or space condition designated for the specific gesture are met. For example, the electronic device 401 may identify whether the touch input meets all of the conditions designated for the gesture among the time condition, length condition, and/or space condition with respect to the reference point (e.g., the touch start point or the end point of the prior touch input).

According to various embodiments, if the touch input meets at least one condition designated for the gesture (Yes in operation 511), the electronic device 401 may execute the function corresponding to the specific gesture in operation 513.

According to various embodiments, if the touch input does not meet the condition designated for the gesture (No in operation 511), the electronic device 401 may display the handwriting (or drawing) corresponding to the touch input on the touchscreen 460 without executing the function corresponding to the specific gesture in operation 507. For example, although the gesture indicated by the touch input meets the gesture generation condition, the electronic device 401 may execute the function corresponding to the specific gesture only when all of the time condition, length condition, and/or space condition designated for the specific gesture are met. Thus, the electronic device 401 may prevent misrecognition of the specific gesture not intended by the user.

Meanwhile, although a method for preventing misrecognition of a touch input generated by the stylus pen or user's hand is described as a major embodiment in the disclosure, the technical spirit of the present invention may not be limited thereto. For example, the technical features of the present invention may also be applied to methods for preventing misrecognition/misinterpretation of an input made by other input devices, such as a mouse or a trackball.

Figure 6:
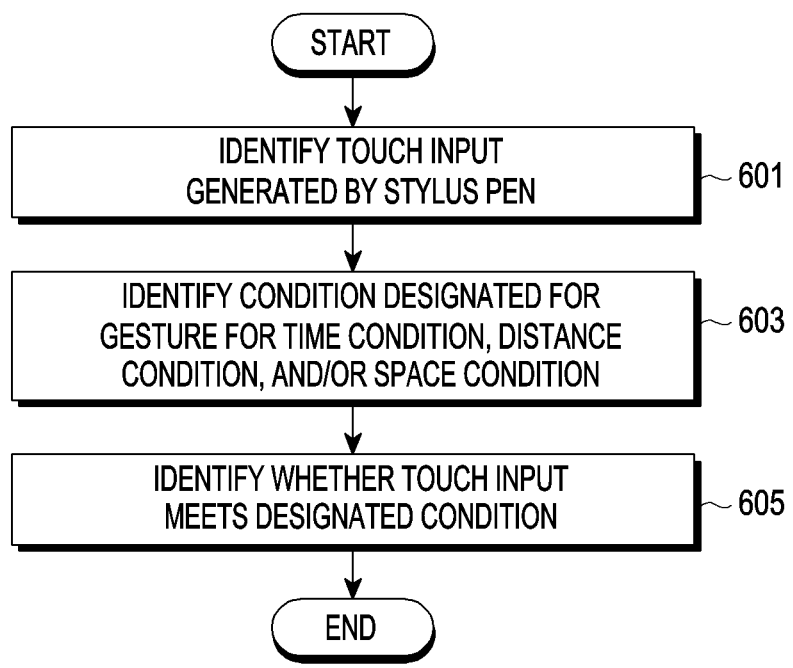
FIG. 6 is a flowchart illustrating an operation of identifying a condition designated for a gesture by an electronic device according to various embodiments.

FIG. 6 is a flowchart illustrating an operation of identifying a condition designated for a gesture by an electronic device according to various embodiments.

Referring to FIG. 6, according to various embodiments, in operation 601, the electronic device 401 may identify a touch input generated by a stylus pen (or the user's hand). For example, the electronic device 401 may identify the gesture indicated by the touch input based on the touch start, touch move, and/or touch completion of the touch input.

Further, the electronic device 401 may identify whether the gesture indicated by the touch input meets the gesture generation condition for generating the specific gesture.

According to various embodiments, in operation 603, if the gesture indicated by the touch input is identified, the electronic device 401 may identify a condition designated for the gesture for the time condition, length condition, and/or space condition. For example, for each of the plurality of gestures supported by the electronic device 401, different conditions may be designated depending on the types of the gesture. For example, a different time condition, length condition, and/or space condition may be designated for each of the plurality of gestures supported by the electronic device 401. Or, for some of the plurality of gestures, if only some conditions among the time condition, length condition, and/or space condition are met, the function corresponding to the specific gesture may be executed. Accordingly, if the gesture indicated by the touch input meets the gesture generation condition for generating the specific gesture, the electronic device 401 may identify the time condition, length condition, and/or space condition designated for the specific gesture.

According to various embodiments, in operation 605, the electronic device 401 may identify whether the touch input meets the condition designated for the gesture. When the touch input meets the designated condition, the electronic device 401 may execute the function designated for the gesture indicated by the touch input. Or, if the touch input does not meet the designated condition, the electronic device 401 may not execute the function designated for the gesture indicated by the touch input.

Figure 7A:
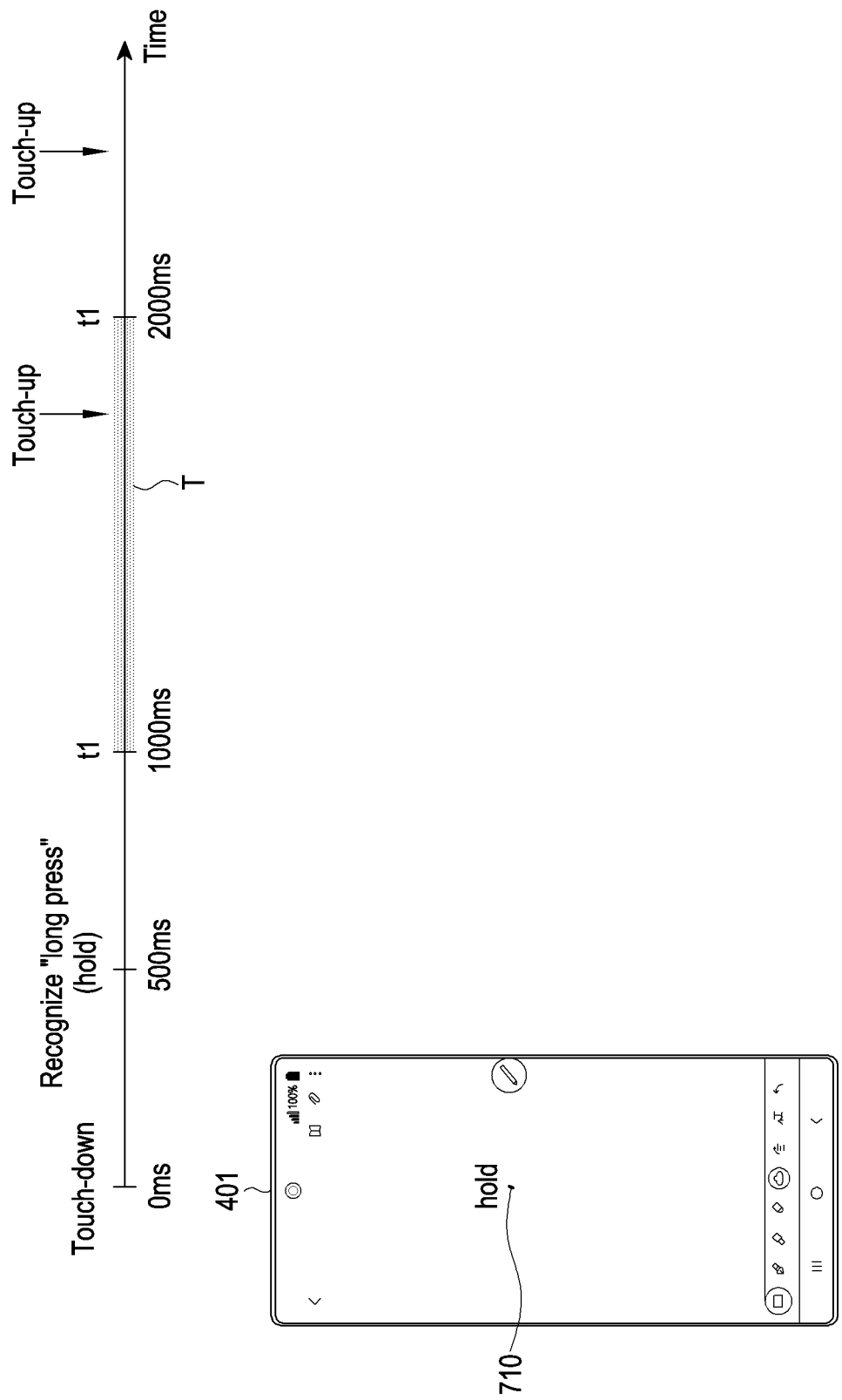
FIGS. 7A, 7B, and 7C are views illustrating a time condition, a second condition, and a length condition for identifying a gesture by an electronic device according to various embodiments.
Figure 7B:
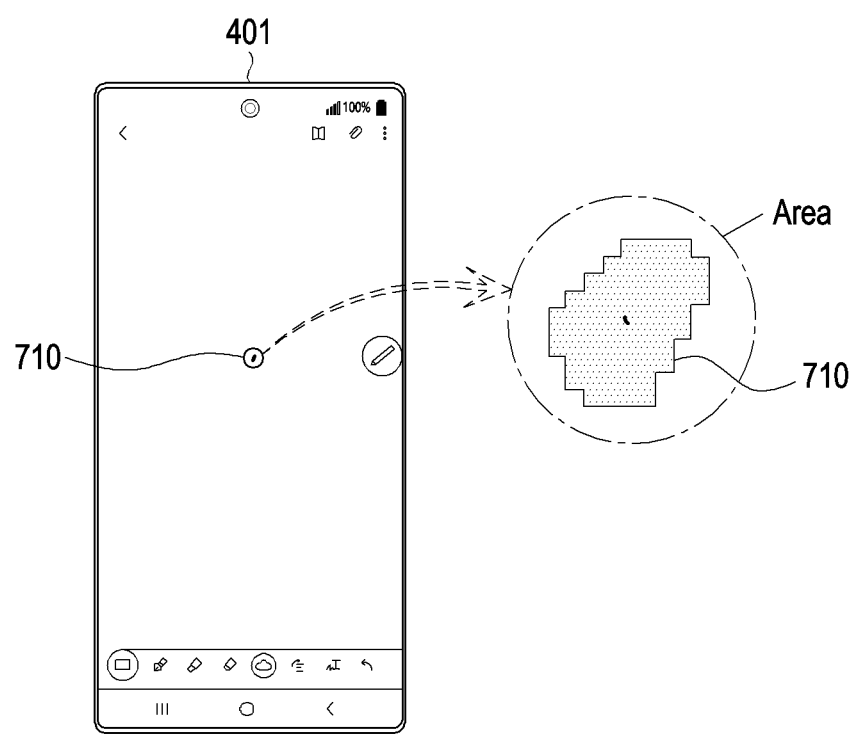
Figure 7C:
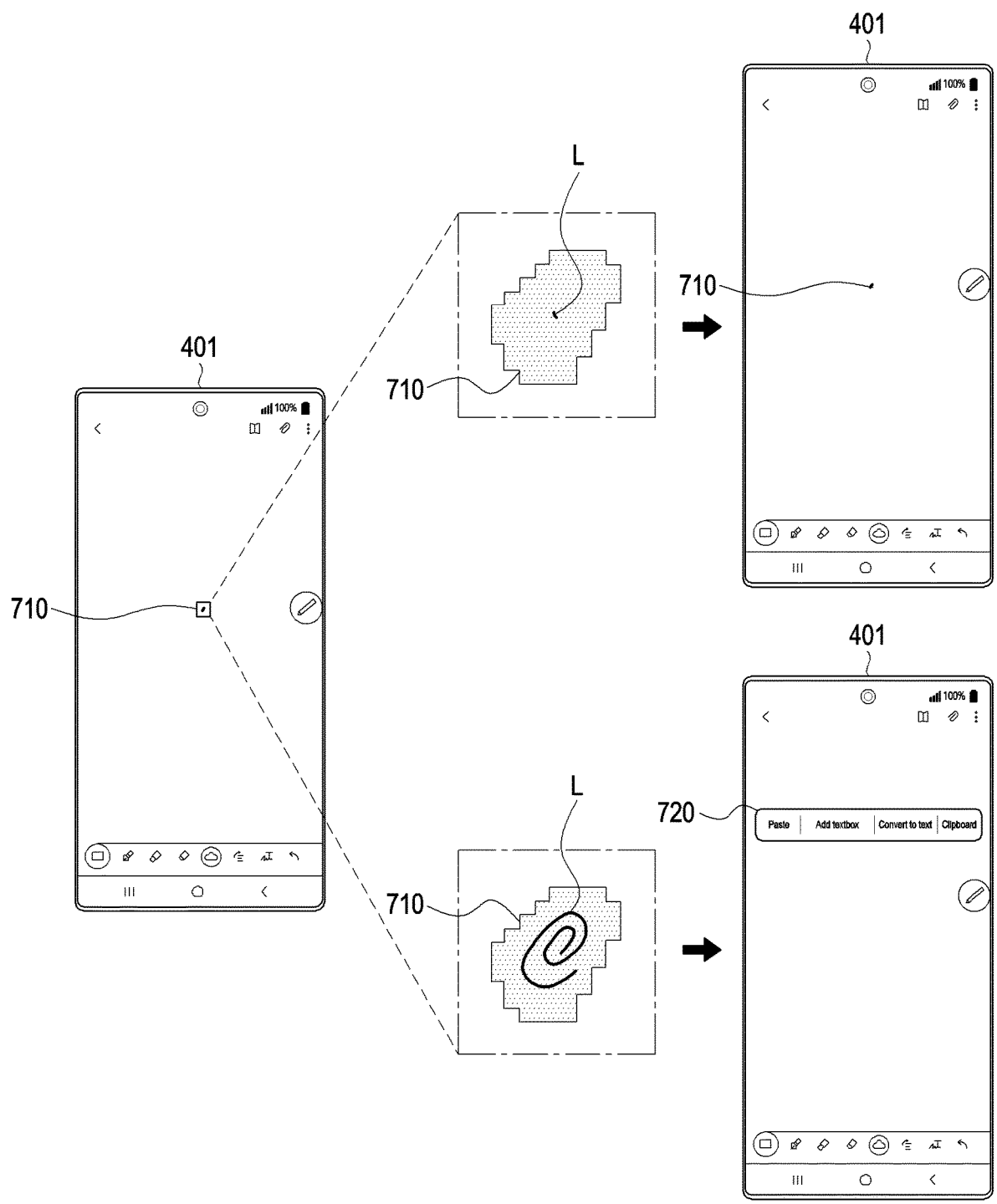

FIGS. 7A, 7B, and 7C are views illustrating a time condition, a second condition, and a length condition for identifying a gesture by an electronic device according to various embodiments.

Referring to FIGS. 7A, 7B, and 7C, according to various embodiments, the electronic device 401 may identify a touch input 710 and compare the gesture indicated by the touch input 710 with a gesture generation condition for generating the specific gesture. The electronic device 401 may identify (or recognize) that the gesture indicated by the touch input 710 is a long press (or hold input) based on a result of the comparison. Upon identifying that the touch input 710 is a "long press" gesture, the electronic device 401 may identify the time condition, space condition, and length condition designated for the "long press" gesture. For example, if all of the time condition, space condition, and length condition are met, the electronic device 401 may execute the function corresponding to the "long press" gesture. Alternatively, if some of the time condition, space condition, and length condition are met, the electronic device 401 may execute the function corresponding to the "long press" gesture.

Referring to FIG. 7A, according to various embodiments, the electronic device 401 may identify whether the touch input 710 meets the time condition for the "long press" gesture. The electronic device 401 may set the touch start (or touch-down) as the reference point of the time condition, for the touch input 710. If the touch completion (or touch-up) is identified in the time period T from a first time t1 to a second time t2 after the touch start (or touch-down) is identified, the electronic device 401 may determine that the touch input 710 meets the time condition for the "long press" gesture. Or, upon identifying the touch completion (or touch-up) outside the time period T after the touch start (or touchdown) is identified, the electronic device 401 may determine that the touch input 710 does not meet the time condition for the "long press" gesture. For example, the first time t1 and the second time t2 larger than the first time t1 may be times preset by the processor 420. Further, the first time t1 may be a time after which the "long press" gesture is recognized or identified. For example, the first time t1 and the second time t2 may be set to be the same or different from each other according to each of the plurality of gestures. It is understood that the values used for t1 and t2 are examples and can vary in one or more embodiments.

Referring to FIG. 7B, according to various embodiments, the electronic device 401 may identify whether the touch input 710 meets the space condition for the "long press" gesture. The electronic device 401 may set the touch start (or touchdown) as the reference point of the space condition for the touch input 710. If the touch input 710 (e.g., the touch move between the touch start (or touchdown) to the touch completion (or touch-up)) is performed in a designated space (or designated area), the electronic device 401 may determine that the touch input 710 meets the space condition for the "long press" gesture. Or, if the touch input 710 departs from the designated space (or designated area), the electronic device 401 may determine that the touch input 710 does not meet the space condition for the "long press" gesture. For example, the designated space (or designated area) may be an area preset by the processor 420. For example, the designated space (or designated area) may be set to be identical or different from each other according to each of the plurality of gestures. For example, the designated space (or designated area) may be a circular area having a specific diameter length or a square area having a specific side length. Or the designated space (or designated area) may be an oval or rectangular area. It is understood that any other predetermined shape can be used. Further, while the example herein describes the gesture being performed inside a designated area, the space condition may specify that the gesture be performed outside the predetermined shape.

Referring to FIG. 7C, according to various embodiments, the electronic device 401 may identify whether the touch input 710 meets the length condition for the "long press" gesture. The electronic device 401 may set the touch start (or touchdown) as the reference point of the length condition, for the touch input 710. If the moving length L of the touch input 710 (e.g., the touch move distance between the touch start and the touch completion) is within a designated length, the electronic device 401 may determine that the touch input 710 meets the length condition for the "long press" gesture. Or, if the moving length L (or moving distance) of the touch input 710 exceeds a designated length, the electronic device 401 may determine that the touch input 710 does not meet the length condition for the "long press" gesture. For example, the designated length may be a length preset by the processor 420. For example, the designated length may be set to be identical or different from each other according to each of the plurality of gestures.

According to various embodiments, if the touch input 710 fails to meet all of the time condition, space condition, and length condition for the "long press" gesture, the electronic device 401 may not execute the function corresponding to the "long press" gesture. For example, if the touch input 710 fails to meet all of the time condition, space condition, and length condition for the "long press" gesture, the electronic device 401 may determine that the "long press" gesture is not to be effected. In this case, the electronic device 401 may display the handwriting corresponding to the touch input 710 on the touchscreen without executing the function corresponding to the "long press" gesture.

According to various embodiments, if the touch input 710 meets all of the time condition, space condition, and length condition for the "long press" gesture, the electronic device 401 may execute the function corresponding to the "long press" gesture. For example, if the touch input 710 meets all of the time condition, space condition, and length condition for the "long press" gesture, the electronic device 401 may determine that the "long press" gesture is to be effected. In this case, the electronic device 401 may display a menu window 720 on the touchscreen. Further, the electronic device 401 may control the touchscreen not to display the handwriting corresponding to the touch input 710.

Figure 8:
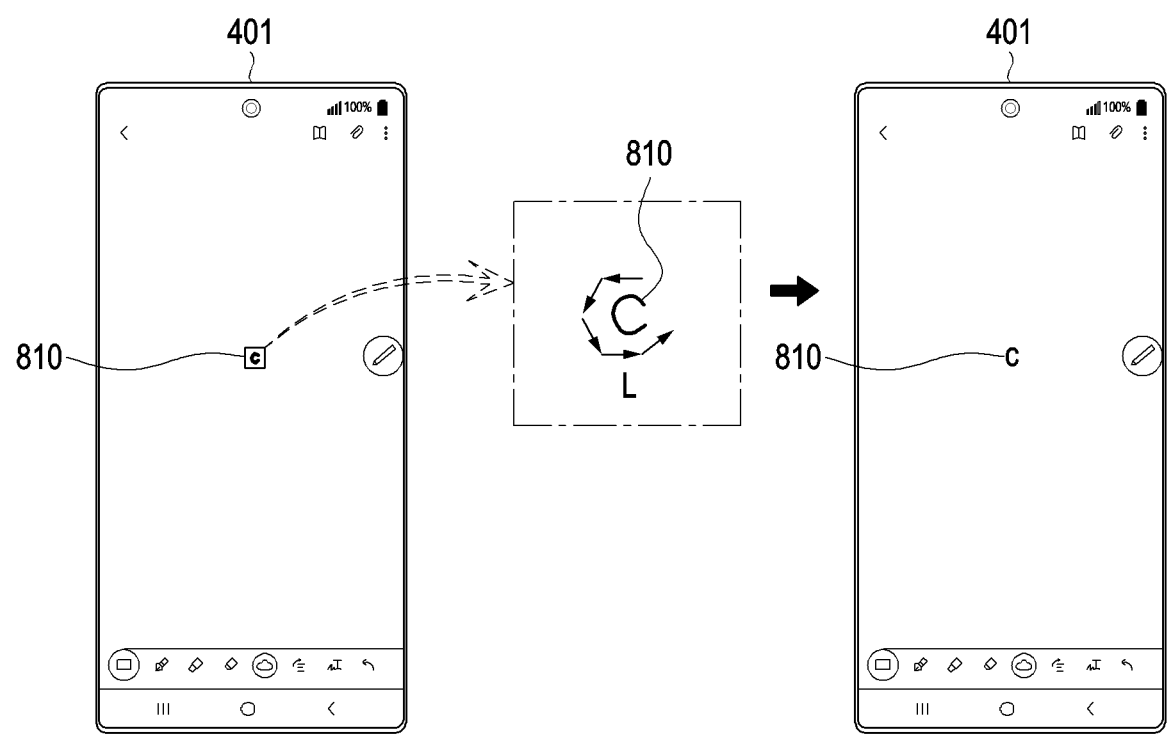
FIG. 8 is a view illustrating an operation of displaying handwriting for a touch input by an electronic device according to various embodiments.

FIG. 8 is a view illustrating an operation of displaying handwriting for a touch input by an electronic device according to various embodiments.

Referring to FIG. 8, according to various embodiments, the electronic device 401 may identify whether the touch input 710 meets the length condition for the "tap" or "click" gesture. The electronic device 401 may set the touch start (or touch-down) as the reference point of the length condition, for the touch input 810. If the moving length of the touch input 810 (e.g., the touch move distance between the touch start and the touch completion) exceeds a designated length, the electronic device 401 may determine that the touch input 810 does not meet the length condition for the "tap" or "click" gesture. For example, since it is highly likely that the "tap" or "click" gesture would make no or little movement from the touch start to the touch completion, if the moving length of the touch input 810 exceeds the designated length, the electronic device 401 may determine that the gesture is not to be effected. For example, if the moving length of the touch input 810 exceeds the designated length, the electronic device 401 may determine that it is in a state of performing handwriting. The electronic device 401 may display handwriting (e.g., the letter "c") corresponding to the touch input 810 on the touchscreen without executing the function corresponding to the "tap" or "click" gesture.

Figure 9:
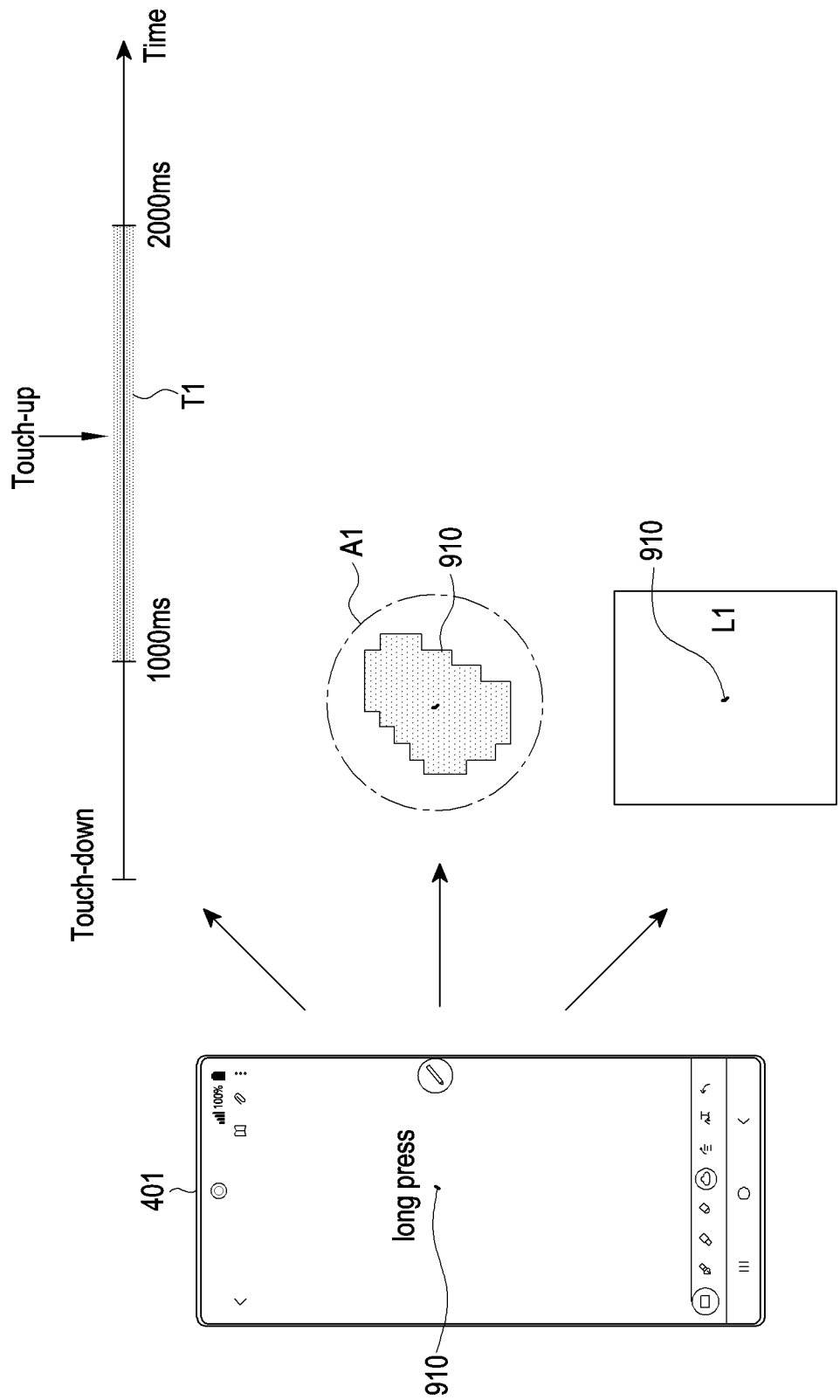
FIG. 9 is a view illustrating an operation of identifying conditions designated for a hold gesture by an electronic device according to various embodiments.

FIG. 9 is a view illustrating an operation of identifying conditions designated for a hold gesture by an electronic device according to various embodiments.

Referring to FIG. 9, according to various embodiments, the electronic device 401 may identify a touch input 910 and compare the gesture indicated by the touch input 910 with a gesture generation condition for generating the specific gesture (e.g., a long press). The electronic device 401 may identify that the gesture indicated by the touch input 910 is a long press based on a result of the comparison. Upon identifying that the gesture indicated by the touch input 910 is a long press, the electronic device 401 may identify the time condition, space condition, and/or length condition designated for the "long press" gesture. For example, the electronic device 401 may identify whether the touch input 910 meets all of the time condition, space condition, and length condition designated for the "long press" gesture.

According to various embodiments, the electronic device 401 may set the start (e.g., touchdown) of the touch input 910 as the reference point of the time condition, space condition, and/or length condition.

According to various embodiments, if the completion (or touch-up) of the touch input 910 is identified in the time period T1 from the reference point (e.g., the touchdown time of the touch input 910) to the first time (e.g., 1000 ms) and the second time (e.g., 2000 ms), the electronic device 401 may determine that the touch input 910 meets the time condition for the "long press" gesture.

According to various embodiments, if the touch input 910 is performed in a designated area A1, the electronic device 401 may determine that the touch input 910 meets the space condition for the "long press" gesture. For example, the designated area A1 may be a circular area whose diameter is 8 dp.

According to various embodiments, if the moving length L1 of the touch input 910 is within a designated length range (e.g., 17 dp), the electronic device 401 may determine that the touch input 910 meets the length condition for the "long press" gesture.

According to various embodiments, if the touch input 910 meets all of the time condition, space condition, and length condition designated for the "long press" gesture, the electronic device 401 may determine that the gesture is to be effected. In this case, the electronic device 401 may execute the function set for the "long press" gesture.

According to another embodiment, if the completion (or touch-up) of the touch input is identified in a time period, the second time (e.g., 2000 ms) after the reference point (e.g., the touchdown time of the touch input), the electronic device 401 may determine that the touch input meets the time condition for the "very long press" gesture. For example, the space condition and length condition for the "very long press" gesture may be identical to the space condition and length condition for the "long press" gesture. For example, if the touch input 910 meets all of the time condition, space condition, and length condition designated for the "very long press" gesture, the electronic device 401 may determine that the gesture is to be effected. In this case, the electronic device 401 may execute the function set for the "very long press" gesture.

Figure 10:
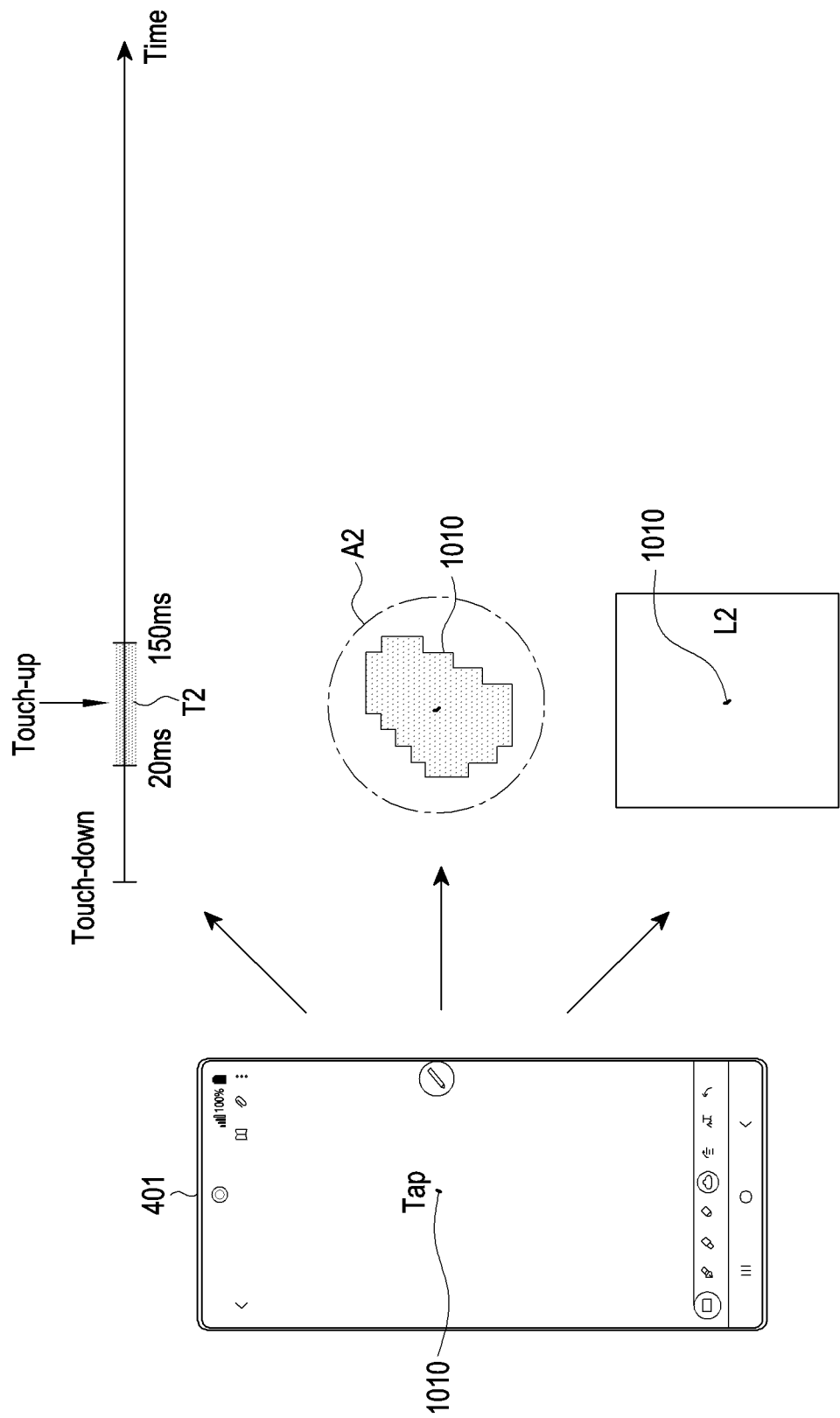
FIG. 10 is a view illustrating an operation of identifying conditions designated for a single tap gesture by an electronic device according to various embodiments.

FIG. 10 is a view illustrating an operation of identifying conditions designated for a single tap gesture by an electronic device according to various embodiments.

Referring to FIG. 10, according to various embodiments, the electronic device 401 may identify a touch input 1010 and compare the gesture indicated by the touch input 1010 with a gesture generation condition for generating the specific gesture (e.g., tap or click). The electronic device 401 may identify that the gesture indicated by the touch input 1010 is a tap (or click) based on a result of the comparison. Upon identifying that the gesture indicated by the touch input 1010 is a tap, the electronic device 401 may identify the time condition, space condition, and/or length condition designated for the "tap" gesture. For example, the electronic device 401 may identify whether the touch input 1010 meets all of the time condition, space condition, and length condition designated for the "tap" gesture.

According to various embodiments, the electronic device 401 may set the start (e.g., touchdown) of the touch input 1010 as the reference point of the time condition, space condition, and/or length condition.

According to various embodiments, if the completion (or touch-up) of the touch input 1010 is identified in the time period T2 from the reference point (e.g., the touchdown time of the touch input 1010) to the first time (e.g., 20 ms) and the second time (e.g., 150 ms), the electronic device 401 may determine that the touch input 1010 meets the time condition for the "tap" gesture.

According to various embodiments, if the touch input 1010 is included in a designated area A2, the electronic device 401 may determine that the touch input 1010 meets the space condition for the "tap" gesture. For example, the designated area A2 may be a circular area whose diameter is 8 dp.

According to various embodiments, if the moving length L2 of the touch input 1010 is within a designated length (e.g., 17 dp), the electronic device 401 may determine that the touch input 1010 meets the length condition for the "tap" gesture.

According to various embodiments, if the touch input 1010 meets all of the time condition, space condition, and length condition designated for the "tap" gesture, the electronic device 401 may determine that the gesture is to be effected. In this case, the electronic device 401 may execute the function set for the "tap" gesture.

Figure 11:
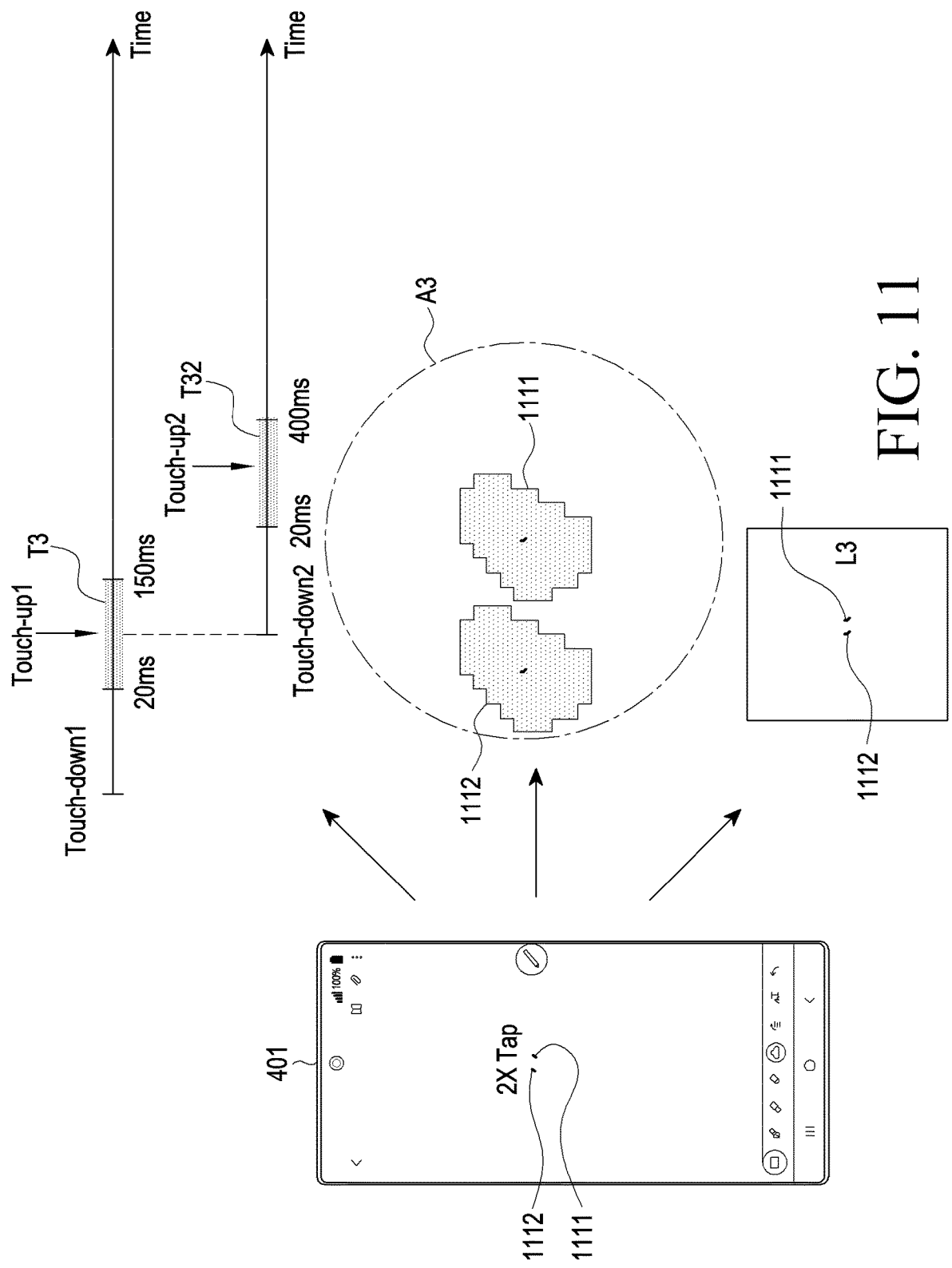
FIG. 11 is a view illustrating an operation of identifying conditions designated for a multi tap gesture by an electronic device according to various embodiments.

FIG. 11 is a view illustrating an operation of identifying conditions designated for a multi-tap gesture by an electronic device according to various embodiments.

Referring to FIG. 11, according to various embodiments, the electronic device 401 may identify a first touch input 1111 and a second touch input 1112 and compare the gesture indicated by the first touch input 1111 and the second touch input 1112 with a gesture generation condition for generating a specific gesture (e.g., a double-tap or multi-tap). The electronic device 401 may identify that the gesture indicated by the first touch input 1111 and the second touch input 1112 is the double-tap (or multi-tap). Upon identifying that the gesture indicated by the first touch input 1111 and the second touch input 1112 is a double-tap, the electronic device 401 may identify the time condition, space condition, and/or length condition designated for the "double-tap" gesture. For example, the electronic device 401 may identify whether the first touch input 1111 and the second touch input 1112 meet all of the time condition, space condition, and length condition designated for the "double-tap" gesture.

According to various embodiments, the electronic device 401 may set the start (e.g., first touchdown) of the first touch input 1111 as the reference point of the time condition, space condition, and length condition of the first touch input 1111. The electronic device 401 may set the completion (e.g., first touch-up) of the first touch input 1111 as a reference point of the time condition of the second touch input 1112. The electronic device 401 may set the start (e.g., first touchdown) of the first touch input 1111 as a reference point of the space condition of the second touch input 1112. Further, the electronic device 401 may set the start (e.g., second touchdown) of the second touch input 1112 as a reference point of the length condition of the second touch input 1112.

According to various embodiments, if the completion (e.g., first touch-up) of the first touch input 1111 is identified in a time period T3 between the reference point and the first time (e.g., 20 ms) and second time (e.g., 150 ms), the electronic device 401 may determine that the first touch input 1111 meets the time condition for the "double-tap" gesture. Further, if the completion (e.g., second touch-up) of the second touch input 1112 after the first touch input 1111 is completed is identified in a time period T32 between the reference point and the first time (e.g., 20 ms) and the second time (e.g., 400 ms), the electronic device 401 may determine that the second touch input 1112 meets a time condition for the "double-tap" gesture.

According to various embodiments, if the first touch input 1111 and the second touch input 1112 are included in a designated area A3, the electronic device 401 may determine that the first touch input 1111 and the second touch input 1112 meet the space condition for the "double-tap" gesture. For example, the designated area A3 may be a circular area whose diameter is 32 dp.

According to various embodiments, if the moving length L3 of each of the first touch input 1111 and the second touch input 1112 is within a designated length (e.g., 10 dp), the electronic device 401 may determine that the first touch input 1111 and the second touch input 1112 meet a length condition for the "double-tap" gesture.

According to various embodiments, if the first touch input 1111 and the second touch input 1112 meet all of the time condition, space condition, and length condition designated for the "double-tap" gesture, the electronic device 401 may determine that the gesture is to be effected. In this case, the electronic device 401 may execute the function set for the "double-tap" gesture.

According to various embodiments, the electronic device 401 may identify whether the "multi-tap" gesture for three or more touch inputs meets the time condition, space condition, and/or length condition based on the same or similar method to those described above.

Figure 12:
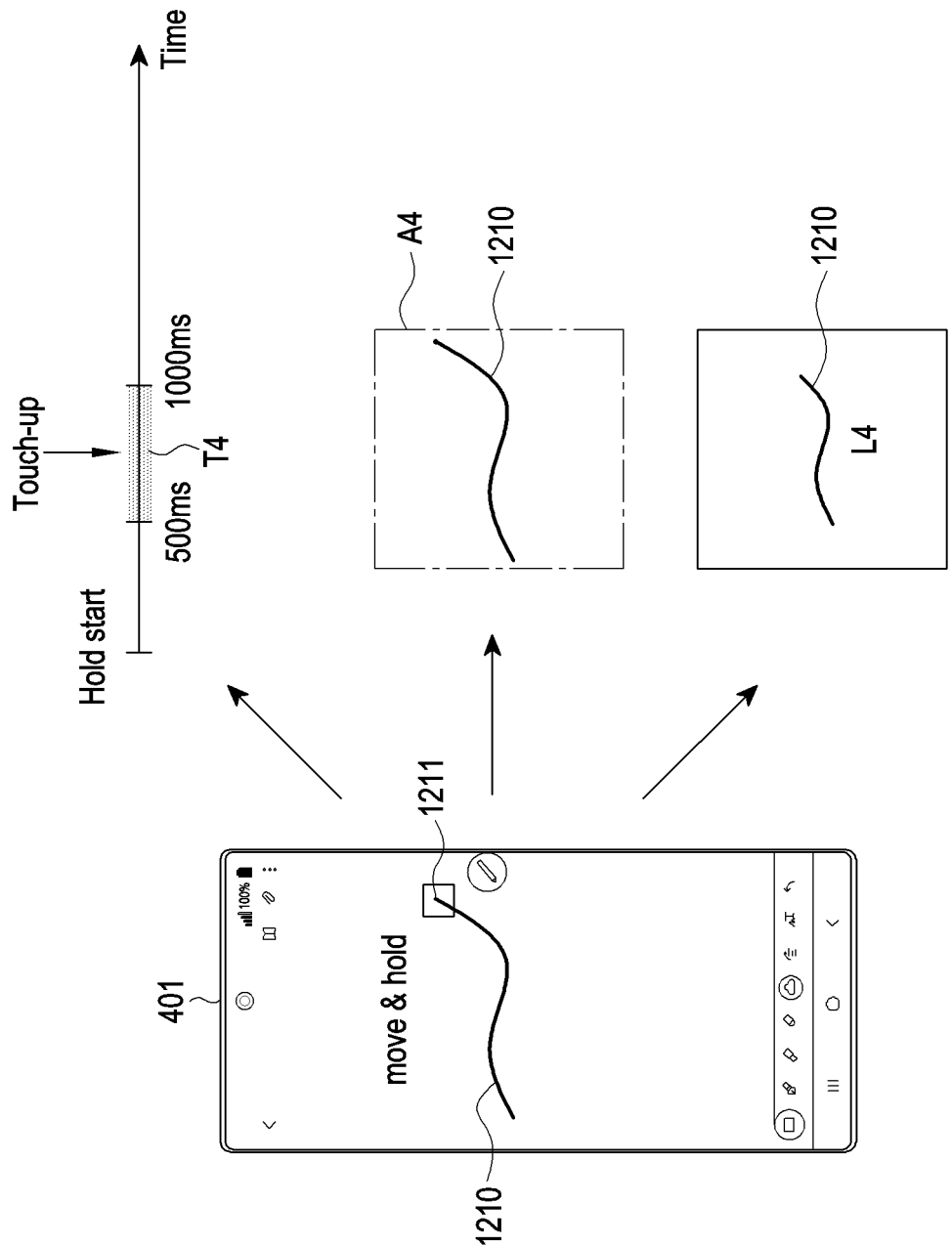
FIG. 12 is a view illustrating an operation of identifying conditions designated for a move and hold gesture by an electronic device according to various embodiments.

FIG. 12 is a view illustrating an operation of identifying conditions designated for a move and hold gesture by an electronic device according to various embodiments.

Referring to FIG. 12, according to various embodiments, the electronic device 401 may identify a touch input 1210 and compare the gesture indicated by the touch input 1210 with a gesture generation condition for generating the specific gesture (e.g., move and wait or move and hold). The electronic device 401 may identify that the gesture indicated by the touch input 1210 is a move and wait based on a result of the comparison. Upon identifying that the gesture indicated by the touch input 1210 is a move and wait, the electronic device 401 may identify the time condition, space condition, and/or length condition designated for the "move and wait" gesture. For example, the electronic device 401 may identify whether the touch input 1210 meets all of the time condition, length condition, and space conditions designated for the "move and wait" gesture.

According to various embodiments, the electronic device 401 may set the start (e.g., touchdown) of the touch input 1210 as the reference point of the time condition, length condition, and/or space condition. If, after the touchdown time of the touch input 1210 is set as the reference point, the touch input 1210 moves and departs off the designated area A4, the electronic device 401 may reset the point at which the touch input 1210 departs off the designated area A4, as the reference point.

According to various embodiments, if the touch input 1210 is included in the designated area A4 with respect to the reference point (e.g., the touchdown time of the touch input 1210), the electronic device 401 may determine that the touch input 1210 meets the space condition for the "move and wait" gesture. For example, the designated area A4 may be a square area having a side that measures 16 dp. Meanwhile, if, after the touchdown time of the touch input 1210 is set as the reference point, the touch input 1210 moves and departs off the designated area A4, the electronic device 401 may reset the point to which the touch input 1210 departs off the designated area A4, as the reference point. In this case, the electronic device 401 may determine whether the touch input 1210 meets the space condition based on whether it is included in an area newly designated with respect to the reset reference point.

According to various embodiments, if the completion (or touch-up or touch hold) of the touch input 1210 is identified in the time period T4 from the reference point (e.g., the touchdown time of the touch input 1210) to the first time (e.g., 500 ms) and the second time (e.g., 1000 ms), the electronic device 401 may determine that the touch input 1010 meets the time condition for the "move and wait" gesture. Meanwhile, if, after the touchdown time of the touch input 1210 is set as the reference point, the touch input 1210 moves and departs off the designated area A4, the electronic device 401 may reset the point to which the touch input 1210 departs off the designated area A4, as the reference point. In this case, the electronic device 401 may determine whether the touch input 1210 meets the time condition based on the reset reference point.

According to various embodiments, if the moving length L4 of the touch input 1210 is within a designated length (e.g., 17 dp), the electronic device 401 may determine that the touch input 1210 meets the length condition for the "move and wait" gesture. Meanwhile, if, after the touchdown time of the touch input 1210 is set as the reference point, the touch input 1210 moves and departs off the designated area A4, the electronic device 401 may reset the point to which the touch input 1210 departs off the designated area A4, as the reference point. In this case, the electronic device 401 may determine whether the touch input 1210 meets the length condition based on the reset reference point.

According to various embodiments, if the touch input 1010 meets all of the time condition, length condition, and space condition designated for the "move and wait" gesture, the electronic device 401 may determine that the gesture is to be effected. In this case, the electronic device 401 may execute the function set for the "move and wait" gesture.

According to various embodiments, if, after the "move and wait" gesture is generated, the held touch input 1210 moves again on the electronic device 401, a "cancel move and wait" gesture may be generated. In this case, the electronic device 401 may execute the function set for the "cancel move and wait" gesture.

Figure 13:
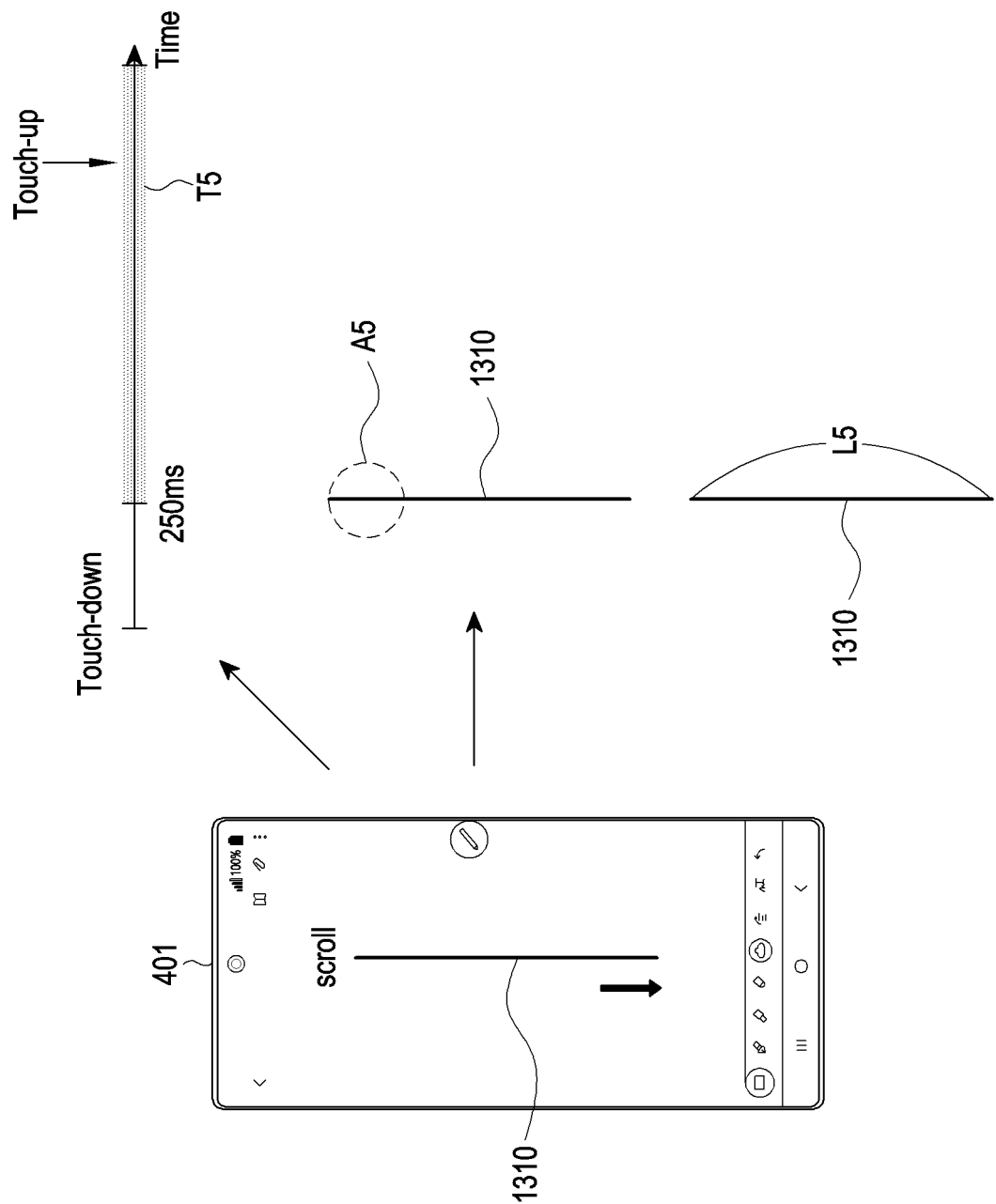
FIG. 13 is a view illustrating an operation of identifying conditions designated for a scroll gesture by an electronic device according to various embodiments.

FIG. 13 is a view illustrating an operation of identifying conditions designated for a scroll gesture by an electronic device according to various embodiments.

Referring to FIG. 13, according to various embodiments, the electronic device 401 may identify a touch input 1310 and compare the gesture indicated by the touch input 1310 with a gesture generation condition for generating the specific gesture (e.g., scroll or fling). The electronic device 401 may identify that the gesture indicated by the touch input 1310 is a scroll (or fling) based on a result of the comparison. Upon identifying that the gesture indicated by the touch input 1310 is a scroll, the electronic device 401 may identify the time condition, space condition, and/or length condition designated for the "scroll" gesture. Or, if the gesture indicated by the touch input 1310 is identified as a fling (e.g., if the scroll speed is a predetermined speed or more at the time of touch-up while the scroll gesture is generated, it is recognized as the fling), the electronic device 401 may identify the time condition, space condition, and/or length condition designated for the "fling" gesture. For example, the electronic device 401 may identify whether the touch input 1010 meets all of the time condition, space condition, and length condition designated for the "scroll (or fling)" gesture.

According to various embodiments, the electronic device 401 may set the start (e.g., touchdown) of the touch input 1310 as the reference point of the time condition, space condition, and/or length condition.

According to various embodiments, if the completion (e.g., touch-up) of the touch input 1310 is identified a first time (e.g., 250 ms) after the reference point (e.g., the touchdown time of the touch input 1310), the electronic device 401 may determine that the touch input 1310 meets the time condition for the "scroll (or fling)" gesture.

According to various embodiments, if the touch input 1310 is positioned in a designated area A5, the electronic device 401 may determine that the touch input 1310 meets the space condition for the "scroll (or fling)" gesture. For example, the designated area A5 may be a circular area whose diameter is 8 dp.

According to various embodiments, if the moving length L5 of the touch input 1310 is a designated length (e.g., 17 dp) or more, the electronic device 401 may determine that the touch input 1310 meets the length condition for the "scroll (or fling)" gesture.

According to various embodiments, if the touch input 1310 meets all of the time condition, space condition, and length condition designated for the "scroll (or fling)" gesture, the electronic device 401 may determine that the gesture is to be effected. In this case, the electronic device 401 may execute the function set for the "scroll (or fling)" gesture.

Figure 14:
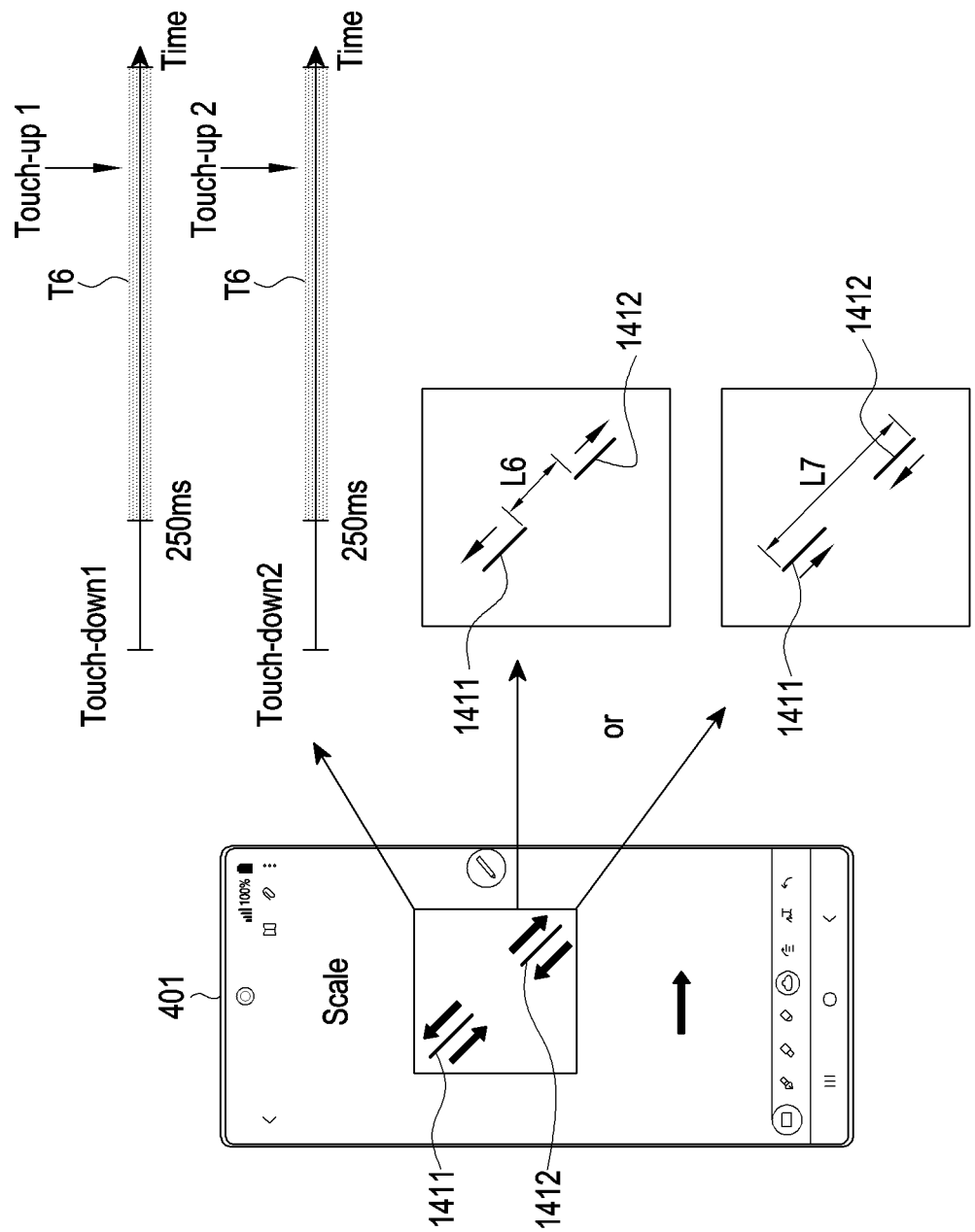
FIG. 14 is a view illustrating an operation of identifying conditions designated for a pinch zoom gesture by an electronic device according to various embodiments.

FIG. 14 is a view illustrating an operation of identifying conditions designated for a pinch-zoom gesture by an electronic device according to various embodiments.

Referring to FIG. 14, according to various embodiments, the electronic device 401 may identify a first touch input 1411 and a second touch input 1412 and compare the gesture indicated by the first touch input 1411 and the second touch input 1412 with a gesture generation condition for generating a specific gesture (e.g., a pinch-zoom). The electronic device 401 may identify that the gesture indicated by the first touch input 1411 and the second touch input 1412 is the pinch zoom. Upon identifying that the gesture indicated by the first touch input 1411 and the second touch input 1412 is a pinch zoom, the electronic device 401 may identify the time condition, space condition, and/or length condition designated for the "pinch zoom" gesture. For example, the electronic device 401 may identify whether the first touch input 1411 and the second touch input 1412 meet all of the time condition and length condition designated for the "pinch zoom" gesture. For example, the electronic device 401 may not consider the space condition for the "pinch zoom" gesture.

According to various embodiments, the electronic device 401 may set the start (e.g., first touchdown) of the first touch input 1411 as the reference point of the time condition and/or length condition of the first touch input 1411. The electronic device 401 may set the start (e.g., second touch-down) of the second touch input 1412 as a reference point of the time condition and/or length condition of the second touch input 1412.

According to various embodiments, if the completion (e.g., first touch-up) of the first touch input 1411 is identified in a time period T6, a first time (e.g., 250 ms) after the reference point (e.g., the first touchdown time of the first touch input 1411), the electronic device 401 may determine that the first touch input 1411 meets the time condition for the "pinch zoom" gesture. Further, if the completion (e.g., second touch-up) of the second touch input 1412 is identified in the time period T6 the first time (e.g., 250 ms) after the reference point (e.g., the second touchdown time of the second touch input 1412), the electronic device 401 may determine that the second touch input 1412 meets the time condition for the "pinch zoom" gesture.

According to various embodiments, if the distance between the first touch input 1411 and the second touch input 1412 is not included in a designated ratio range (e.g., range of L6 (or L7)*0.8 to L6 (or L7)*1.2) with respect to the distance (L6 or L7) between the touchdown points, the electronic device 401 may determine that the first touch input 1411 and the second touch input 1412 meet the length condition for the "pinch zoom" gesture.

According to various embodiments, if the first touch input 1411 and the second touch input 1412 meet all of the time condition and length condition designated for the "pinch zoom" gesture, the electronic device 401 may determine that the gesture is to be effected. In this case, the electronic device 401 may execute the function set for the "pinch zoom" gesture.

Figure 15:
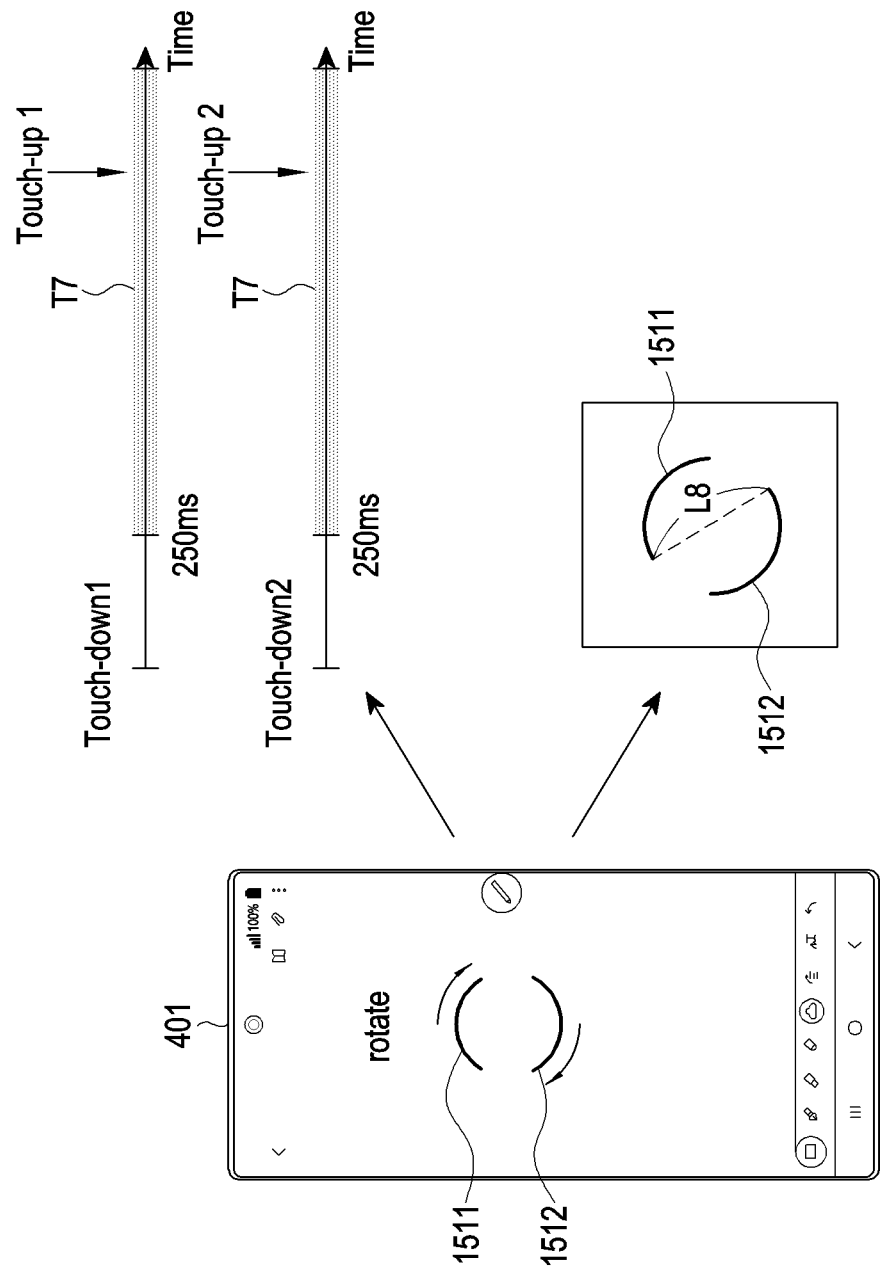
FIG. 15 is a view illustrating an operation of identifying conditions designated for a rotate gesture by an electronic device according to various embodiments.

FIG. 15 is a view illustrating an operation of identifying conditions designated for a rotation gesture by an electronic device according to various embodiments.

Referring to FIG. 15, according to various embodiments, the electronic device 401 may identify a first touch input 1511 and a second touch input 1512 and compare the gesture indicated by the first touch input 1511 and the second touch input 1512 with a gesture generation condition for generating a specific gesture (e.g., rotate). The electronic device 401 may identify that the gesture indicated by the first touch input 1511 and the second touch input 1512 is a rotation. Upon identifying that the gesture indicated by the first touch input 1511 and the second touch input 1512 is a rotation, the electronic device 401 may identify the time condition, space condition, and/or length condition designated for the "rotate" gesture. For example, the electronic device 401 may identify whether the first touch input 1511 and the second touch input 1512 meet all of the time condition and length condition designated for the "rotate" gesture. For example, the electronic device 401 may not consider the space condition for the "rotate" gesture.

According to various embodiments, the electronic device 401 may set the start (e.g., first touchdown) of the first touch input 1511 as the reference point of the time condition and/or length condition of the first touch input 1511. The electronic device 401 may set the start (e.g., second touch-down) of the second touch input 1512 as a reference point of the time condition and length condition of the second touch input 1512.

According to various embodiments, if the completion (e.g., first touch-up) of the first touch input 1511 is identified in a time period T7, a first time (e.g., 250 ms) after the reference point (e.g., the first touchdown time of the first touch input 1511), the electronic device 401 may determine that the first touch input 1511 meets the time condition for the "rotate" gesture. Further, if the completion (e.g., second touch-up) of the second touch input 1512 is identified in the time period T7 the first time (e.g., 250 ms) after the reference point (e.g., the second touchdown time of the second touch input 1512), the electronic device 401 may determine that the second touch input 1512 meets the time condition for the "rotate" gesture.

According to various embodiments, if the distance between the first touch input 1511 and the second touch input 1512 is a designated length (e.g., 32 dp) or more, the electronic device 401 may determine that the first touch input 1511 and the second touch input 1512 meet the length condition for the "rotate" gesture.

According to various embodiments, if the first touch input 1511 and the second touch input 1512 meet all of the time condition and length condition designated for the "rotate" gesture, the electronic device 401 may determine that the gesture is to be effected. In this case, the electronic device 401 may execute the function set for the "rotate" gesture.

Meanwhile, the values for the time condition, space condition, and length condition for the gestures and the types of gestures described in connection with FIGS. 9 to 15 may be exemplary for convenience of description. The technical spirit of the present invention may not be limited thereto.

Figure 16:
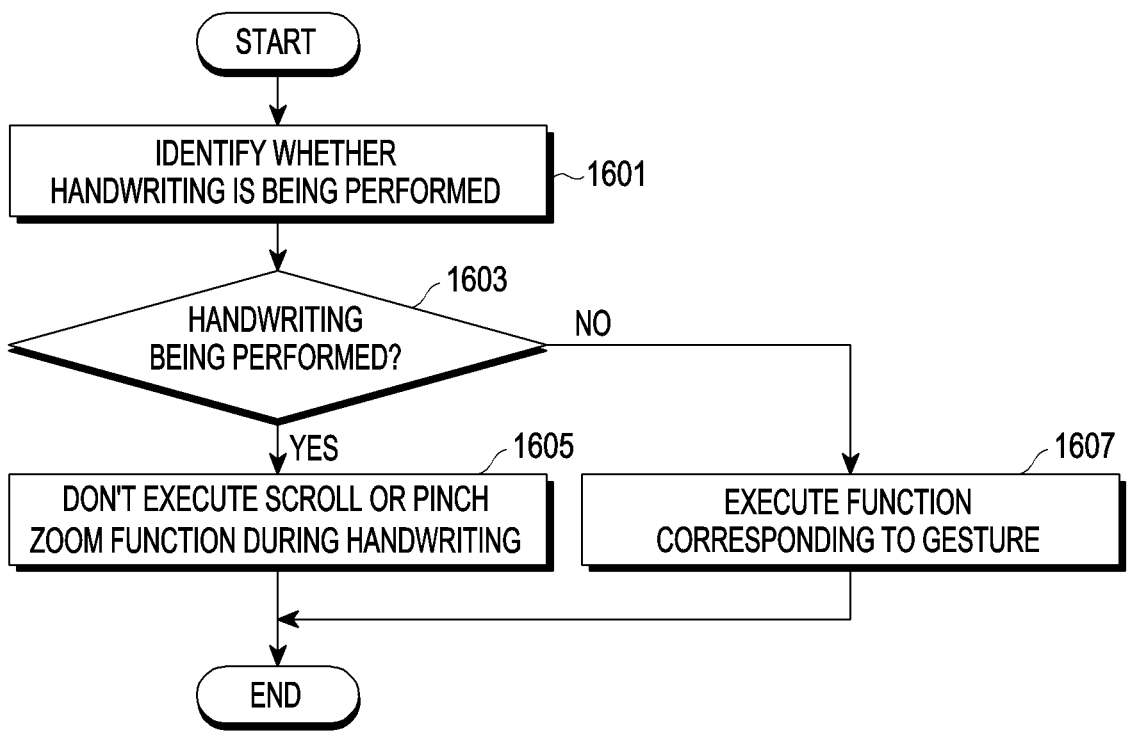
FIG. 16 is a flowchart illustrating an operation for preventing misrecognition of a gesture function during handwriting by an electronic device according to various embodiments.

FIG. 16 is a flowchart illustrating an operation for preventing misrecognition of a gesture function during handwriting by an electronic device according to various embodiments.

According to various embodiments, in operation 1601, the electronic device 401 may identify whether handwriting is being performed. For example, upon determining that the touch input 1310 does not indicate a specific gesture or the gesture indicated by the touch input is not to be effected, the electronic device 401 may determine that handwriting is being performed.

According to various embodiments, if handwriting is being performed (Yes, in operation 1603), the electronic device 401 may not execute the function corresponding to a scroll (or fling) or pinch-zoom during handwriting. Thus, the electronic device 401 may prevent misrecognition of the scroll gesture or pinch zoom gesture due to a palm touch made while the user performs handwriting.

According to various embodiments, if handwriting is not being performed (No in operation 1603), the electronic device 401 may execute the function corresponding to the specific gesture in operation 1607. For example, the electronic device 401 may execute the function corresponding to the scroll or pinch zoom.

Figure 17:
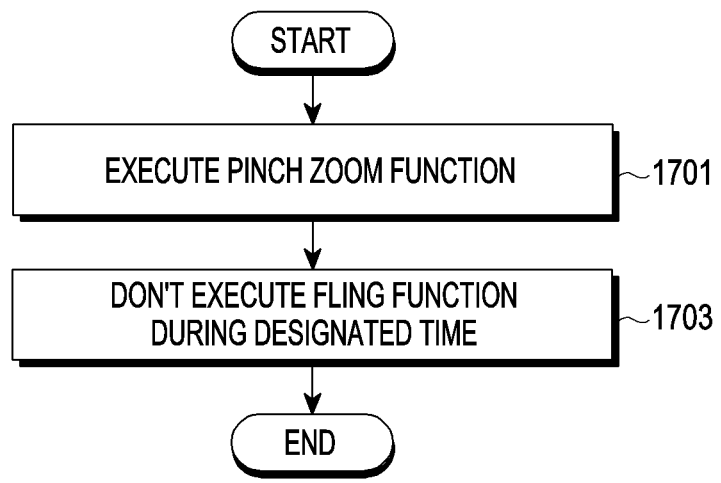
FIG. 17 is a flowchart illustrating an operation for preventing misrecognition of a fling function when a pinch zoom function is executed by an electronic device according to various embodiments.

FIG. 17 is a flowchart illustrating an operation for preventing misrecognition of a fling function when a pinch-zoom function is executed by an electronic device according to various embodiments.

According to various embodiments, in operation 1701, the electronic device 401 may execute a pinch-zoom function. For example, if the pinch-zoom gesture indicated by the touch input is determined to be to be effected, the electronic device 401 may execute the function (e.g., pinch zoom function) corresponding to the pinch-zoom gesture.

According to various embodiments, in operation 1703, the electronic device 401 may not execute a fling function during a designated time after the execution of the pinch-zoom function is terminated. For example, the designated time may be set by the processor 420 and be 200 ms. Thus, the electronic device 401 may prevent misrecognition of the fling gesture that may occur due to the pinch-zoom gesture.

According to various embodiments, an electronic device 101 or 401 may comprise a touchscreen 460 and a processor 420 configured to identify a touch input generated by a stylus pen 201 via the touchscreen, identify whether the touch input meets a first condition for generating a specific gesture, identify whether the touch input meets a second condition including at least one of a time condition, a length condition, and a space condition, using a touch start point of the touch input or an end point of a prior touch input as a reference point, based on the touch input meeting the first condition, and execute a function corresponding to the specific gesture based on the touch input meeting the second condition.

The second condition may be designated to differ depending on a type of the specific gesture among a plurality of gestures.

The processor may be configured not to execute the function corresponding to the specific gesture when the touch input meets the first condition and does not meet the second condition.

The processor may be configured to display handwriting corresponding to the touch input on the touchscreen.

The processor may be configured to identify that the touch input meets the time condition when an end of the touch input is identified in a time period between a first time and a second time larger than the first time, with respect to the reference point.

The processor may be configured to identify that the touch input meets the length condition when a moving distance of the touch input is identified in a length range between a first length and a second length larger than the first length, with respect to the reference point.

The processor may be configured to identify that the touch input meets the length condition when the touch input includes a plurality of touch inputs made to different points, and a distance between the plurality of touch inputs is not included in a designated ratio range with respect to a distance between start points of the plurality of touch inputs.

The processor may be configured to identify that the touch input meets the length condition when the touch input includes a plurality of touch inputs made to different points, and a distance between the plurality of touch inputs is larger than a designated distance.

The processor may be configured to identify that the touch input meets the space condition when the touch input is identified in a circular space having a designated length of diameter or a square space having a designated length of side, with respect to the reference point.

The processor may be configured to identify that the touch input meets the space condition when the touch input is identified outside a circular space having a designated length of diameter with respect to the reference point.

According to various embodiments, a method for operating an electronic device 101 or 401 may comprise identifying a touch input generated by a stylus pen via a touchscreen included in the electronic device; identifying whether the touch input meets a first condition for generating a specific gesture; identifying whether the touch input meets a second condition including at least one of a time condition, a length condition, and a space condition, using a touch start point of the touch input or an endpoint of a prior touch input as a reference point, based on the touch input meeting the first condition; and executing a function corresponding to the specific gesture based on the touch input meeting the second condition The second condition is designated to differ depending on a type of each of the plurality of gestures.

The method for operating the electronic device may further comprise displaying handwriting corresponding to the touch input on the touchscreen without executing the function corresponding to the specific gesture when the touch input meets the first condition and does not meet the second condition.

Executing the function corresponding to the specific gesture may include identifying that the touch input meets the time condition when an end of the touch input is identified in a time period between a first time and a second time larger than the first time, with respect to the reference point.

Executing the function corresponding to the specific gesture may include identifying that the touch input meets the length condition when a moving distance of the touch input is identified in a length range between a first length and a second length larger than the first length, with respect to the reference point.

Executing the function corresponding to the specific gesture may include identifying that the touch input meets the length condition when the touch input includes a plurality of touch inputs made to different points, and a distance between the plurality of touch inputs is not included in a designated ratio range with respect to a distance between start points of the plurality of touch inputs.

Executing the function corresponding to the specific gesture may include identifying that the touch input meets the length condition when the touch input includes a plurality of touch inputs made to different points, and a distance between the plurality of touch inputs is larger than a designated distance.

Executing the function corresponding to the specific gesture may include identifying that the touch input meets the space condition when the touch input is identified in a circular space having a designated length of diameter or a square space having a designated length of side, with respect to the reference point.

Executing the function corresponding to the specific gesture may include identifying that the touch input meets the space condition, when the touch input is identified outside a circular space having a designated length of diameter, with respect to the reference point.

According to various embodiments, a non-transitory recording medium may store one or more programs, the one or more programs comprising instructions configured to, when executed by a processor of an electronic device, cause the electronic device to identify a touch input generated by a stylus pen via a touchscreen included in an electronic device, identify whether the touch input meets a first condition for generating a specific gesture, identify whether the touch input meets a second condition including at least one of a time condition, a length condition, and a space condition, using a touch start point of the touch input or an end point of a prior touch input as a reference point, based on the touch input meeting the first condition, and execute a function corresponding to the specific gesture based on the touch input meeting the second condition.

What is claimed is:

1. An electronic device comprising,
a touchscreen; and
a processor configured to,
identify a touch input generated by a stylus pen via the touchscreen,
identify whether a gesture corresponding to the touch input meets a first condition for determining a specific gesture among a plurality of gestures predetermined in the electronic device,
based on identifying that the gesture does not meet the first condition, display a handwriting corresponding to the touch input,
based on identifying that the gesture meets the first condition, identify whether the gesture meets a second condition designated in the gesture including at least one of a time condition, a length condition, and a space condition, using a touch start point of the touch input or an endpoint of a prior touch input as a reference point, and
based on identifying that the gesture meets the first condition and the second condition, execute a function corresponding to the specific gesture,
wherein the second condition is designated to differ depending on a type of the specific gesture among the plurality of gestures.

2. The electronic device of claim 1, wherein the specific gesture includes a single tap, a multi-tap, a hold, a long press, a move and hold, a scroll input, a fling input, movement of two touches in different directions, or rotation of two touches in different directions.

3. The electronic device of claim 1, wherein the processor is configured not to execute the function corresponding to the specific gesture when the gesture meets the first condition and does not meet the second condition.

4. The electronic device of claim 3, wherein the processor is configured to display handwriting corresponding to the touch input on the touchscreen when the gesture meets the first condition and does not meet the second condition.

5. The electronic device of claim 1, wherein the processor is configured to identify that the gesture meets the time condition when an end of the touch input is identified in a time period between a first time and a second time larger than the first time, with respect to the reference point.

6. The electronic device of claim 1, wherein the processor is configured to identify that the gesture meets the length condition when a moving distance of the touch input is identified in a length range between a first length and a second length larger than the first length, with respect to the reference point.

7. The electronic device of claim 1, wherein the processor is configured to identify that the gesture meets the length condition when the gesture includes a plurality of touch inputs sequentially input at different points, and a distance between the plurality of touch inputs is not included in a designated ratio range with respect to a distance between start points of the plurality of touch inputs.

8. The electronic device of claim 1, wherein the processor is configured to identify that the gesture meets the length condition when the gesture includes a plurality of touch inputs sequentially input at different points, and a distance between the plurality of touch inputs is larger than a designated distance.

9. The electronic device of claim 1, wherein the processor is configured to identify that the gesture meets the space condition when the touch input is identified in a circular space having a designated length of diameter or a square space having a designated length of side, with respect to the reference point,
wherein the reference point is designated as a center point of the circular space or the square space.

10. The electronic device of claim 1, wherein the processor is configured to identify that the gesture meets the space condition when the touch input is identified outside a circular space having a designated length of diameter with respect to the reference point,
wherein the reference point is designated as a center point of the circular space.

11. A method for operating an electronic device, the method comprising,
identifying a touch input generated by a stylus pen via a touchscreen included in the electronic device;
identifying whether a gesture corresponding to the touch input meets a first condition for determining a specific gesture among a plurality of gestures predetermined in the electronic device;
based on identifying that the gesture does not meet the first condition, displaying a handwriting corresponding to the touch input,
based on identifying that the gesture meets the first condition, identifying whether the gesture meets a second condition designated in the gesture including at least one of a time condition, a length condition, and a space condition, using a touch start point of the touch input or an endpoint of a prior touch input as a reference point, based on the touch input meeting the first condition; and
based on identifying that the gesture meets the first condition and the second condition, executing a function corresponding to the specific gesture,
wherein the second condition is designated to differ depending on a type of the specific gesture among the plurality of gestures.

12. The method of claim 11, wherein the specific gesture includes a single tap, a multi-tap, a hold, a long press, a move and hold, a scroll input, a fling input, movement of two touches in different directions, or rotation of two touches in different directions.

13. The method of claim 11, further comprising displaying handwriting corresponding to the touch input on the touchscreen without executing the function corresponding to the specific gesture when the gesture meets the first condition, and does not meet the second condition.

14. The method of claim 11, wherein identifying whether the gesture meets that second condition includes, identifying that the gesture meets the time condition when an end of the touch input is identified in a time period between a first time and a second time larger than the first time, with respect to the reference point.

15. The method of claim 11, wherein identifying whether the gesture meets the second condition includes,
identifying that the gesture meets the length condition when a moving distance of the touch input is identified in a length range between a first length and a second length larger than the first length, with respect to the reference point.

16. The method of claim 11, wherein identifying whether the gesture meets the second condition includes,
identifying that the gesture meets the length condition when the gesture includes a plurality of touch inputs sequentially input at different points, and a distance between the plurality of touch inputs is not included in a designated ratio range with respect to a distance between start points of the plurality of touch inputs.

17. The method of claim 11, wherein identifying whether the gesture meets the second condition includes,
identifying that the touch input meets the length condition when the gesture includes a plurality of touch inputs sequentially input at different points, and a distance between the plurality of touch inputs is larger than a designated distance.

18. The method of claim 11, wherein identifying whether the gesture meets the second condition includes,
identifying that the gesture meets the space condition when the touch input is identified in a circular space having a designated length of diameter or a square space having a designated length of side, with respect to the reference point,
wherein the reference point is designated as a center point of the circular space or the square space.

19. The method of claim 11, wherein identifying whether the gesture meets the second condition includes,
identifying that the gesture meets the space condition, when the touch input is identified outside a circular space having a designated length of diameter, with respect to the reference point,
wherein the reference point is designated as a center point of the circular space.

20. A non-transitory computer readable storage medium storing one or more programs, the one or more programs comprising instructions configured to, when executed by a processor of an electronic device, cause the electronic device to:
identify a touch input generated by a stylus pen via a touchscreen included in an electronic device;

identify whether a gesture corresponding to the touch input meets a first condition for determining a specific gesture among a plurality of gestures predetermined in the electronic device;

based on identifying that the gesture does not meet the first condition, display a handwriting corresponding to the touch input, based on identifying that the gesture meets the first condition, identify whether the gesture meets a second condition designated in the gesture including at least one of a time condition, a length condition, and a space condition, using a touch start point of the touch input or an endpoint of a prior touch input as a reference point, based on the touch input meeting the first condition; and based on identifying that the gesture meets the first condition and the second condition, execute a function corresponding to the specific gesture based on the touch input meeting the second condition, wherein the second condition is designated to differ depending on a type of the specific gesture among the plurality of gestures.

\* \* \* \* \*